(12) United States Patent
Deshpande et al.

(10) Patent No.: US 7,630,370 B2
(45) Date of Patent: Dec. 8, 2009

(54) OVERLAY JOIN LATENCY REDUCTION USING PREFERRED PEER LIST

(75) Inventors: Sachin G. Deshpande, Vancouver, WA (US); Jeonghun Noh, Stanford, CA (US)

(73) Assignee: Sharp Laboratories of America, Inc., Camas, WA (US)

(*) Notice: Subject to any disclaimer, the term of this patent is extended or adjusted under 35 U.S.C. 154(b) by 458 days.

(21) Appl. No.: 11/680,434

(22) Filed: Feb. 28, 2007

(65) Prior Publication Data

US 2008/0205394 A1     Aug. 28, 2008

(51) Int. Cl.
- H04L 12/28   (2006.01)
- H04L 12/56   (2006.01)
- H04J 3/26    (2006.01)
- G06F 15/173  (2006.01)
- H04B 7/00    (2006.01)
- H04B 15/00   (2006.01)

(52) U.S. Cl. .................. 370/390; 370/255; 370/432; 709/224; 455/503

(58) Field of Classification Search .................. 370/390
See application file for complete search history.

(56) References Cited

U.S. PATENT DOCUMENTS

| | | | |
|---|---|---|---|
| 4,354,229 A | | 10/1982 | Davis et al. |
| 6,147,992 A | * | 11/2000 | Giroir et al. ............ 370/390 |
| 6,804,236 B1 | | 10/2004 | Mahajan et al. .......... 370/390 |
| 7,174,382 B2 | * | 2/2007 | Ramanathan et al. ...... 709/227 |
| 7,227,863 B1 | * | 6/2007 | Leung et al. ............ 370/390 |
| 2004/0085912 A1 | | 5/2004 | Xu et al. |
| 2004/0143672 A1 | * | 7/2004 | Padmanabham et al. .... 709/231 |
| 2004/0236863 A1 | | 11/2004 | Shen et al. |
| 2005/0060406 A1 | * | 3/2005 | Zhang et al. ............ 709/225 |
| 2005/0091399 A1 | | 4/2005 | Candan et al. |
| 2005/0157659 A1 | * | 7/2005 | Huitema ................. 370/254 |
| 2005/0163061 A1 | * | 7/2005 | Piercey et al. ........... 370/255 |
| 2005/0201405 A1 | | 9/2005 | Liu et al. |
| 2005/0213514 A1 | * | 9/2005 | Su et al. ................ 370/254 |
| 2005/0216559 A1 | | 9/2005 | Manion et al. |
| 2005/0243740 A1 | | 11/2005 | Chen et al. |
| 2006/0053209 A1 | | 3/2006 | Li |
| 2006/0168104 A1 | | 7/2006 | Shimizu et al. |
| 2006/0291459 A1 | * | 12/2006 | Bain ..................... 370/389 |
| 2007/0036175 A1 | * | 2/2007 | Zimmermann et al. ...... 370/467 |

FOREIGN PATENT DOCUMENTS

| | | |
|---|---|---|
| EP | 0 035 789 A2 | 9/1981 |
| EP | 1 515 520 A2 | 3/2005 |

OTHER PUBLICATIONS

Padmanabhan, V.; Wang, H.; and Chou, P.,"Distributing Streaming Media Content Using Cooperative Networking,"ACM NOSSDAV, May 12-14, 2002, Miami, FL.,USA.

(Continued)

Primary Examiner—William Trost, IV
Assistant Examiner—Andrew Chriss
(74) Attorney, Agent, or Firm—Michael Blaine Brooks; Michael B. Brooks; David Ripma

(57) ABSTRACT

The embodiments of the invention relate to application-layer multicasting, particularly to reduction of join/attachment latency of a node when joining a multicast group, by providing to a joining node a flat peer list and a preferred peer list which contains candidate node entries with recent available bandwidth information.

21 Claims, 19 Drawing Sheets

FOREIGN PATENT DOCUMENTS

| EP | 1 533 952 A1 | 5/2005 |
| EP | 1 633 111 A1 | 3/2006 |
| EP | 1 643 716 A1 | 4/2006 |
| JP | 2006-074744 | 3/2006 |
| JP | 2006-079606 | 3/2006 |

OTHER PUBLICATIONS

Shen, Y.; Liu, Z.; Panwar, S.; Ross, K.; and Wang, Y.,"Streaming Layered Endcoded Video Using Peers,"IEEE International Conference on Multimedia and Expo(ICME), Jul. 2005.

Banerjee, S.; Bhattacharjee, B.; and Kommareddy, C., "Scalable Application Layer Multicast," ACM SIGCOMM, Aug. 19-23, 2002, Pittsburgh, Pennsylvania, USA.

Chu,Y.; Rao, S.; and Zhang, H.,"A Case for End System Multicast," Proceedings of ACM SIGMETRICS, Jun. 2000, Santa Clara, CA., USA.

Chu,Y.;Ganjam, A.;Ng,T.;Rao, S.;Sripanidkulchai,K.; Zhan, J.; Zhang, H., "Early Experience with an Internet Broadcast System based on Overlay Multicast,"USENIX'04, Jun. 2004.

* cited by examiner

OVERLAY JOIN LATENCY REDUCTION USING PREFERRED PEER LIST

FIELD OF THE INVENTION

The embodiments of the present invention relate to application-layer multicasting, particularly to reducing join latency.

BACKGROUND

Application-layer multicasting is currently being developed. One delay that is incurred is the join latency delay that typically occurs from when a node starts-up to the time it joins the multicast group and starts receiving video frames, for example. Ways of reducing this join latency delay are highly desirable.

SUMMARY

In one aspect, a method of processing in a multicast group is provided. The method includes several steps. One step is maintaining, by a first device, a preferred peer cache (PPC) associated with the multicast group comprising one or more nodes. The PPC comprises one or more preferred peer list (PPL) nodes, and each of the PPL nodes is associated with a node from the one or more nodes of the multicast group, and wherein each PPL node is associated with a node-identifying information, an estimated available bandwidth of said each PPL node, and one or more relationships between said each PPL node to another node of the one or more nodes in the multicast group. Another further step is updating, by the first device, the PPC if at least one of the following occurs: a departure message is received indicating that a node of the one or more nodes of the multicast group is in a state of departure from the multicast group; and a join report message is received indicating that a new node has joined the multicast group to become a node of the one or more nodes of the multicast group. Other steps include receiving, by a second device, a preferred peer list (PPL), based on the PPC comprising one or more PPL nodes, and a flat peer list (FPL) comprising one or more FPL nodes, wherein the one or more FPL nodes are randomly selected nodes from the one or more nodes of the multicast group; and transmitting, by the second device, an attachment request to at least one PPL node of the PPL.

In another aspect, a device adapted to be operably connected to a multicast group is provided. The device includes a preferred peer cache (PPC) management module and a flat peer list (FPL) and preferred peer list (PPL) generation module. The PPC management module is adapted to maintain a preferred peer cache (PPC) associated with the multicast group comprising one or more nodes. The PPC comprises one or more PPL nodes, each of the PPL nodes is associated with a node from the one or more nodes of the multicast group and wherein each PPL node is associated with a node-identifying information, an estimated available bandwidth of said each PPL node, and one or more relationships between said each PPL node to another node of the one or more nodes in the multicast group. The PPC management module is also adapted to update the PPC if at least one of the following occurs: a departure message is received indicating that a node of the one or more nodes of the multicast group is in a state of departure from the multicast group; and a join report message is received indicating that a new node has joined the multicast group to become a node of the one or more nodes of the multicast group. The FPL and PPL generation module is adapted to generate a PPL based on the PPC, wherein the PPL comprises one or more PPL nodes; adapted to generate a flat peer list (FPL) comprising one or more FPL nodes, wherein the one or more FPL nodes are randomly selected nodes from the one or more nodes of the multicast group; and adapted to transmit the generated FPL and the generated PPL in response to a join request by a joining node.

In another aspect, a device, adapted to be operably connected to a multicast group comprising one or more nodes and a rendezvous point server, is provided. The device includes a rendezvous point interface module, a node attachment module, and a heartbeat module. The rendezvous point interface module is adapted to receive, from the rendezvous point server, a flat peer list (FPL) comprising one or more FPL nodes, wherein the one or more FPL nodes are randomly selected from the one or more nodes of the multicast group; and receive, from the rendezvous point server, a preferred peer list (PPL) comprising one or more PPL nodes, wherein each PPL node is associated with a node of the one or more nodes of the multicast group and wherein each PPL node is associated with an estimated bandwidth. The node attachment module is adapted to transmit an attachment request to a node of the one or more nodes of the multicast group; receive an attachment response in response to the transmitted attachment request; and transmit a join report message to the rendezvous point server based on the received attachment response. The heartbeat module is adapted to transmit at least one heartbeat message; monitor heartbeat messages; and if heartbeat messages are not received based on a condition, transmit a departure message indicating that a node of the one or more nodes of the multicast group is in a state of departure.

BRIEF DESCRIPTION OF THE DRAWINGS

The embodiments of the present invention are illustrated by way of example and not limitation in the figures of the accompanying drawings, and in which.

DETAILED DESCRIPTION

Figure 1:
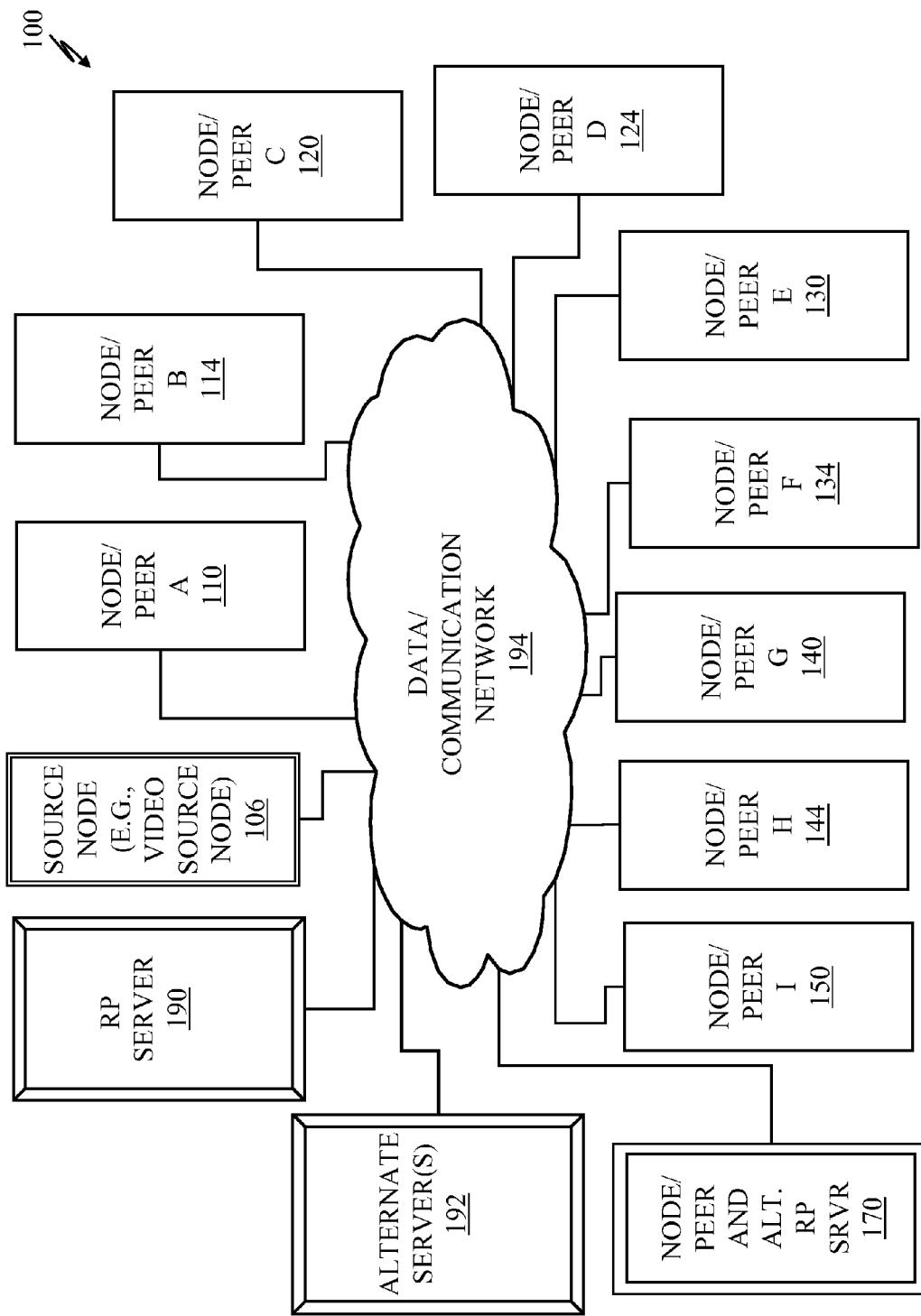
FIG. 1 is a high-level block diagram of an exemplary multicast system, according to an embodiment of the invention.
Figure 2:
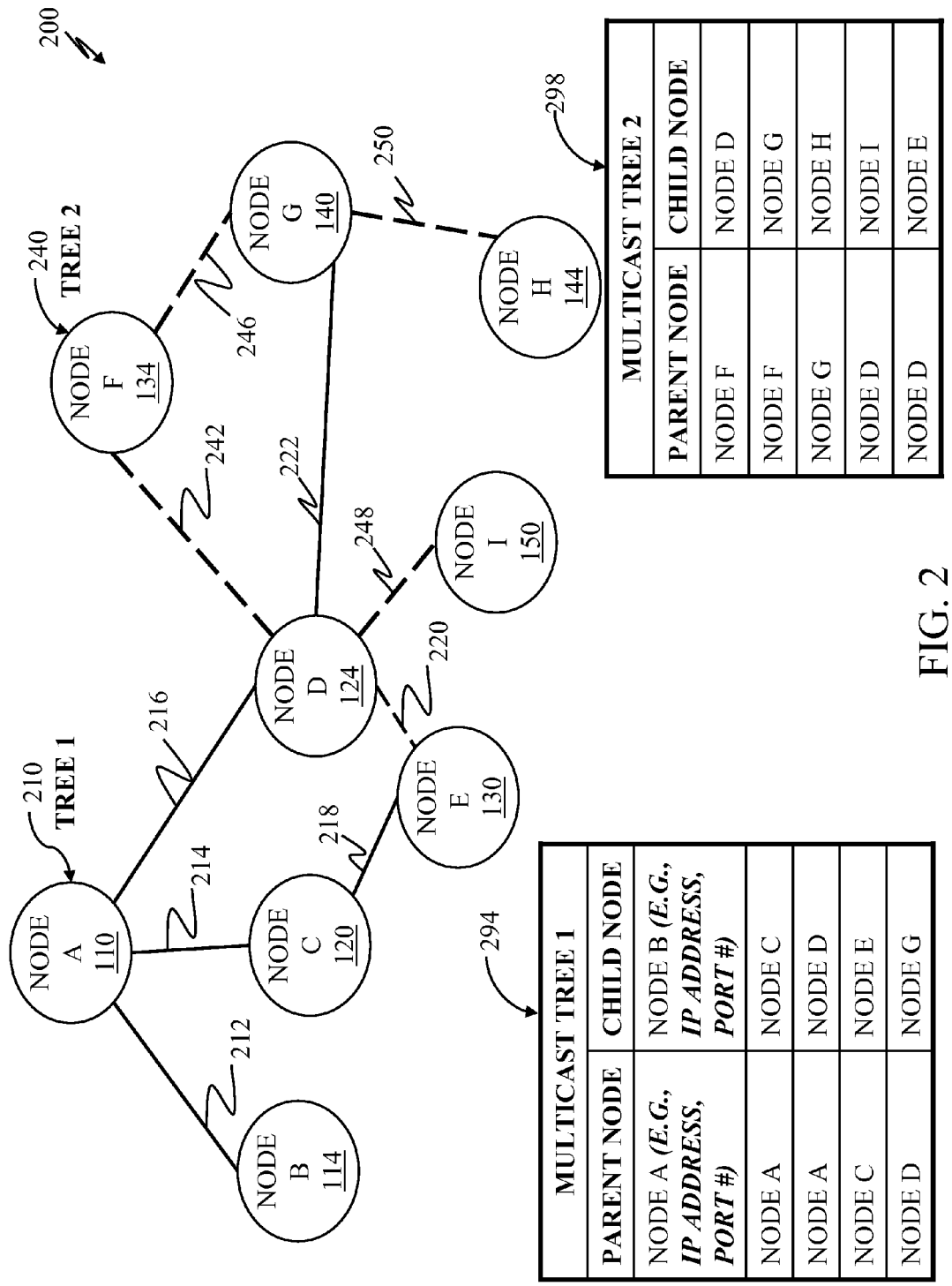
FIG. 2 is a representative diagram of a multicast group with two multicast trees, according to embodiments of the invention.

To better understand the figures, reference numerals within the one hundred series, for example, 190 and 194, are initially introduced in FIG. 1, reference numerals in the two hundred series, for example, 200 and 294, are initially introduced in FIG. 2, and so on and so forth. So, reference numerals in the nine hundred series, e.g. 908 and 918, are initially introduced in FIG. 9.

In general, content distribution, particularly distribution of streaming data may be generally classified into two categories: infrastructure-based content distribution and peer-to-peer content distribution. An infrastructure-based distribution network generally employs a dedicated set of machines to store and distribute contents to clients on behalf of the server. On the other hand, the peer-to-peer content distribution framework employs clients to host and distribute content to other clients. The embodiments of the present invention generally relate to peer-to-peer content distribution, particularly in an overlay multicast environment.

Multicasting in general is a one-to-many delivery service. Unlike native or network-layer multicasting, e.g., Internet Protocol (IP) multicasting, where data packets are replicated, for example, at routers, in end-system multicasting, data packets are typically replicated at the end systems or hosts. The embodiments of the present invention relate to end-system multicasting, wherein multicast-related functions are typically handled at the end systems, such as hosts or nodes or peers, rather than by routers and switches. Such end-system multicast-related functions may include group membership, multicast routing, and packet duplication. End-system multicasting is sometimes also referred to as application-layer multicasting, overlay multicasting, or peer-to-peer multicasting. The embodiments of the present invention relate to end-system multicasting/application-layer multicasting/overlay multicasting and not to network-layer multicasting, such as IP multicasting.

Overlay multicasting generally employs a delivery scheme wherein data are delivered to a group of destination or receiver/client nodes or end hosts simultaneously. In an overlay multicast, an overlay network is logically built on top of available network services and packets are multicasted at the application later. The overlay may be organized such that each end host, end system, node, or peer, participating in an overlay multicast communication retransmits multicasted messages to some or all of its peers/nodes, but typically not to all of them. Overlay multicasting thus employs a peer-to-peer network to distribute data or source content to participants in the multicast.

Furthermore, in an overlay multicast, the end systems are organized into a logical overlay structure, typically employing a distributed protocol. This overlay structure typically indicates the spanning trees, routes, or paths for data delivery, and is generally a logical overlay over a physical network structure. Each path in the overlay structure typically corresponds to a unicast path between two nodes. This overlay structure may typically be represented as a tree, which may be a binary tree or an n-ary tree structure. This overlay structure is also sometimes referred to as a multicast tree. The nodes of the present invention typically participate and communicate in the overlay multicast via one or more multicast trees or multicast structures.

One delay that is incurred in overlay multicasting is the latency for a node/peer—wishing to join or become a member of the overlay multicast or multicast group—to join the overlay structure or multicast group. This join latency typically relates to the time when the joining peer transmits its request to join the overlay multicast group and the time for the joining peer to actually join and attach to all the overlay structures or trees in the overlay multicast, and start receiving data, for example, video frames. The embodiments of the present invention in particular reduce this overlay join latency by having a rendezvous point server (RP) transmit to the joining node two peer lists—a flat peer list (FPL) and a preferred peer list (PPL).

FIG. 1 is an exemplary system 100 adapted to perform peer-to-peer content distribution using overlay multicasting, according to an embodiment of the present invention. The system 100 includes a multicast group consisting of a number of end-systems, particularly a rendezvous point server (RP) 190 and several nodes or peers—node A 110, node B 114, node C 120, node D 124, node E 130, node F 134, node G 140, node H 144, node I 150, and a super dual-function node 170, which are operably coupled to each other via a data or communication network 194, such as the Internet, a wide area network, a metropolitan area network, a local area network, or a virtual private network. The exemplary system 100 includes network entities such as routers and switches, not shown. The nodes 110, 114, 120, 124, 130, 134, 140, 144, 150, 170 and/or the RP servers 190, 192 may be adapted to perform peer-to-peer content distribution. In some embodiments, the nodes 110-150 may also be operably coupled to an alternate RP server 192 and/or a super dual-function node 170, via this exemplary data network 194. The exemplary system 100 typically includes a source node 106, e.g., a video source node 106, which typically hosts the video stream or streaming source content to be transmitted. The source node 106 may be operably coupled to the various entities 110-192 in this exemplary system also via the network 194. In some embodiments, the RP server node 190, the alternate RP server 192, or the super-node 170 may function as the source node 106.

The RP 190 is an end-system host that typically all members know a-priori. An RP 190 is a designated host for a multicast group, which typically assists in managing group membership by transmitting to a joining node a preferred peer list and a flat peer list, from which a joining node may then use as a basis for selecting that joining node's parent(s). Generally, a node, for example, node A 110, wishing to join a multicast group first contacts the RP 190. In some embodiments, the RP server 190 may assign or direct a joining node to an alternate RP server 192 or to a super dual-function node 170 adapted to also perform the functions of the RP server, in particular, transmitting the flat peer list (FPL) and the preferred peer list (PPL), and maintaining a preferred peer cache (PPC), from which the PPL is based or derived. The super node 170 is a dual-function node adapted to function as an RP server and also as a peer node to other nodes. The RP server 190 may direct a joining node to initiate or submit the join request to this super node 170 or to the alternate RP server 192. The joining node then typically interfaces with this alternate RP server 192 or super node 170 to complete its join process, for example, transmitting to these alternate RP entities the Join Report after the successful attachment of the joining node to parent nodes. In other embodiments, the alternate RP servers may also function as mirror RP servers. In some embodiments, there is only one central RP; while for other embodiments, the function of the RP is shared by multiple RP entities. For discussion purposes, an entity functioning as an RP server, e.g., an alternate RP server or a super node, is hereinafter also referred to as an RP in general.

FIG. 2 is a high-level representation 200 of exemplary multicast trees or overlay structures, according to embodiments of the present invention. Overlay structures, such as multicast trees, may function as a logical distribution tree, wherein each node of the tree may transmit a received stream to each of its children or child nodes using unicast. In some embodiments, the received stream is a substream, e.g., a multiple description coding (MDC) stream, scalable layer stream (e.g., base layer and enhancement layers), or partitioned in some other ways, e.g., round robin packet partitioning. Such overlay structures may include binary trees, n-ary trees, or any other tree structure, for example.

In general, a node may have a parent or child relationship with another node. The overlay structure of the present invention may include multiple trees, but with one root node or with multiple root nodes. In some embodiments, the two root nodes 110, 134 exemplified may be one and the same node. In general, a child node may receive data from its parent node(s). A child may have one or more parents, while a parent node may have one or more child nodes. Typically, a child node has just one parent within each multicast tree, but a parent node may have multiple child nodes within the same multicast tree. A child node in a particular multicast tree, however, may have two parents for a temporary duration, for example, during a soft handover approach, as described later herein. In some embodiments, the overlay multicast group includes more than one multicast tree 210, 240 as exemplified and shown. In other embodiments, only one multicast tree is present in the multicast group.

An RP 190, 192, 170 typically tracks and maintains all instances of multicast trees within its multicast group, e.g., via membership information, which may include all the nodes or entities adapted to perform peer-to-peer content distribution. Typically membership information may include node-identifying information, e.g., the Internet Protocol (IP) address and port number of each node. Typically, membership information maintained for each node is minimal or small, so long as the node may be uniquely identified. Each node may also be associated with a multicast tree, e.g., via a tree identification number field—which may be part of the membership information, indicating with which tree or trees a node is also a member, for example. In some embodiments, multicast tree information is not included in the membership information, as shown.

In some embodiments, not shown, each node, or at least the parent nodes, in the multicast group maintains or has access to information about all multicast trees in the multicast group, including which nodes belong to which multicast tree. Thus, each node may also maintain or have access to its own multicast group information.

The first multicast tree 210 has paths shown with solid lines 212, 214, 216, 218, 222, while the second multicast tree 240 has paths shown with dashed lines 220, 242, 246, 248, 250. In this embodiment, the first multicast tree has as its root, node A 110. Node A is the parent of node B 114, node C 120, and node D 124. Node C 120 is the parent of node E 130. Node D 124 is the parent of node G 140. The first multicast tree structure 210 may be represented by an exemplary parent-child relationship or membership information database 294, e.g., stored in flat files, relational database management systems, and linked lists. This membership information of a multicast tree may be stored in volatile and/or non-volatile memory, for example. The membership information of the exemplary multicast group or a portion thereof 100, 200 is herein exemplified via two tables 294, 298. In some embodiments, these two sets of information may be combined, for example, within one table. One of ordinary skill in the art will appreciate that such membership information may be stored and structured in various manners, e.g., as different data structures or fields. In some embodiments, node A 110 and node F 134 may be the same physical node. In some embodiments, node A and node F may also be the source node 106, e.g., video source node.

The second multicast tree 240 has node F 134 as its root node. Node F is the parent of node D 124 and node G 140. Node D is the parent of node I 150 and node E 130, and node G is the parent of node H 144. The relationships between the nodes within the second multicast tree 240 are represented in an exemplary table 298.

In some embodiments, the number of child nodes a parent node may support is a function of the uplink/upload bandwidth of the parent, e.g., if the parent node has more upload bandwidth support, the more child nodes that parent node may be adapted to support. In other embodiments, the multicast structure, such as the multicast tree, may be constructed and maintained so as to reduce tree depth or height, for example, to maintain a balanced tree.

Figure 3:
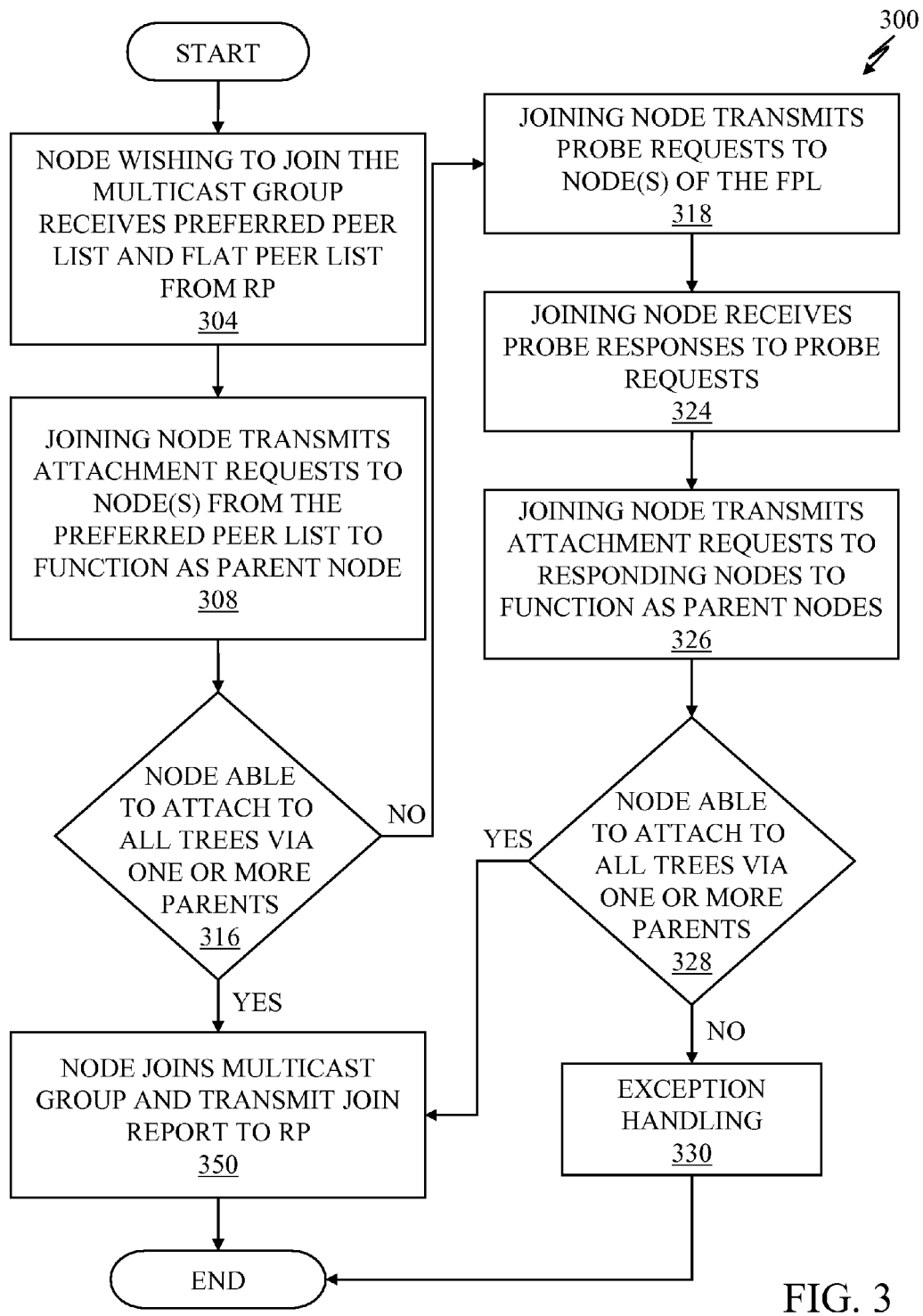
FIG. 3 is a flowchart of an exemplary process illustrating the process for joining a multicast group, according to an embodiment of the invention.

FIG. 3 is a flowchart of an exemplary process 300 for joining a multicast group according to an embodiment of the invention. In general, a node wishing to join the multicast group—a joining node—first contacts the RP 190 indicating to the RP that the joining node wishes to join the multicast group. Typically, this means that the joining node may wish to join all multicast trees maintained by the RP. Typically, a joining node has to be attached to all multicast trees in the system. In other embodiments, the joining node wishes to join a defined number of multicast trees, for example, just some multicast trees in the multicast group. The RP may directly respond to this request, alternatively direct the joining node to submit such join request to an alternate RP server 192 or a super node 170. The response of the RP 190, 192, 170, in general, to this join request is to transmit to the joining node a preferred peer list (PPL) and a flat peer list (FPL) (step 304). From these two lists, each list containing nodes, the joining node selects with which nodes to attach as a child node (step 304). In this embodiment of the invention, the joining node, not the RP, selects the parents of the joining node.

The FPL, in general, is a list of nodes/peers from the multicast group selected randomly by the RP. Any random generation scheme may be employed, for example, using random seed numbers. The FPL typically contains at least one candidate parent node for each available multicast tree in the multicast group for that joining node. The PPL, on the other hand, typically contains at least one candidate parent node for each available multicast tree in the multicast group for that joining node, wherein each of the candidate parent nodes is typically based from entries or nodes in a preferred peer cache group (PPC). The PPL and the PPC typically contain nodes with the most recently updated information, such as the most recently updated estimated available bandwidth; thus, the PPL contain nodes that have a high probability of having available bandwidth to support additional child nodes, such as the joining node. In general, the joining node attempts to join and attach to candidate nodes in the PPL, if unsuccessful, the joining node may then resort to joining or attaching to candidate nodes listed in the FPL.

Based on the PPL, the joining node transmits attachment requests to the nodes contained in the PPL (step 308). An attachment request, in general, indicates that the joining node is requesting that the joining node be a child node of the node to which the attachment request is being transmitted. By attaching to a parent node, the joining node is also attached to or becomes part of one or more multicast tree(s) considering that the parent node is typically part of at least one multicast tree. In some embodiments, the joining node transmits an attachment request to all nodes in the PPL, e.g., in parallel. In other embodiments, the joining node transmits a parent-attachment request to only a subset of the nodes in the PPL, if that subset of nodes enables the joining node to be attached to all multicast trees or to the defined number of trees in the multicast group or system.

Assuming in this exemplary embodiment that a joining node has to attach to all multicast trees maintained by the RP, if the joining node is able to attach to all the multicast trees via the appropriate number of parent nodes in the PPL (step 316, "yes" branch), the joining node then transmits a Join Report communication or message to the RP or the appropriate entity 190, 192, 170 functioning as the joining node's RP. The Join Report generally indicates to the RP the list of parent nodes with which the joining node is attached as a child node, including which multicast tree, if appropriate (step 350). Typically, by attaching to all trees, the joining node, now attached, is now part of the multicast group and may now start receiving data, such as video substreams. If the request for parent attachment is granted by the node in the PPL, the appropriate multicast tree(s) and membership information are appropriately updated by the appropriate RP entity 190, 192, 170. The parent node typically as part of its attachment granting process, calculates its new bandwidth considering that the parent node is now adapted to support its new child node, i.e., the joining node. The upload bandwidth calculation process may be based on the number of children of such parent node and the rate of transmission for each child node, for example. In some embodiments, if the parent node maintains its own multicast group information, the parent node may also accordingly update its multicast information.

On the other hand, if the joining node is not able to attach to all the multicast trees (step 316, "no" branch), the joining node then transmits probe requests to nodes listed in the FPL (step 318). In some embodiments the joining node may send the probe requests (step 318) in parallel with direct attachment requests, instead of serially as exemplified in FIG. 3. Probe requests are typically requests to determine the current availability of the node to which the probe request is sent. In response to these probe requests, the joining node typically receives probe responses from nodes that receive the probe requests (step 324). Based on the received probe responses, the joining node accordingly transmits parent attachment requests to one or more, which may be all, of the nodes contained in the FPL so that these nodes become parents of this joining node (step 326). The determination of which nodes in the FPL to transmit attachment requests may be based on certain conditions, such as the results of probe tests or with which trees the joining node is not yet attached in the multicast group.

If the joining node is able to attach to all the multicast trees, whether via nodes in the PPL and/or FPL (step 328, "yes" branch), the joining node accordingly transmits a Join Report to the RP 190, 192, 170 indicating the parent nodes of the joining node, including the associated multicast trees (step 350). On the other hand, if the joining node is not able to attach to all the multicast trees maintained by the RP, exception-handling procedures may be performed (step 330). Such exception-handling procedures may include informing the joining node to retry the join process, transmitting a new FPL, and/or transmitting a new PPL to the joining node. The nodes in the FPL with which the joining node is able to attach as a child node may also accordingly calculate and update their bandwidth availability.

Overall Exemplary Protocol:

In embodiments of the present invention, the RPs, whether one or more, may maintain preferred peer cache group (PPC) information, which typically contains recent available information. Such recent information may be based on messages exchanged between nodes, e.g., heartbeat messages, departure messages, and Join Reports.

Figure 4:
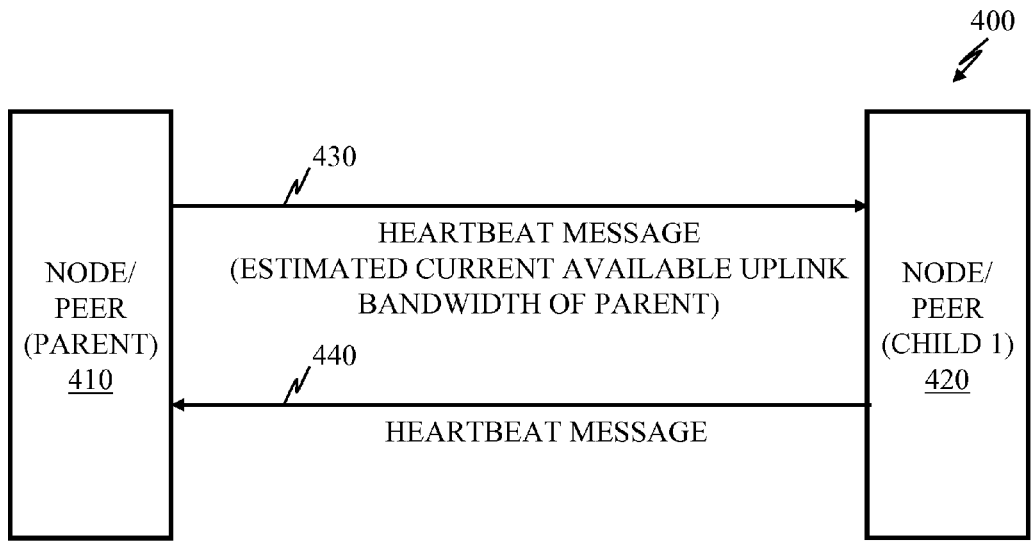
FIG. 4 is an exemplary data flow of heartbeat messages according to an embodiment of the invention.

Heartbeat Messages:

FIG. 4 illustrates an exemplary data flow 400 of heartbeat messages according to embodiments of the present invention. Heartbeat messages between nodes, which have a parent or child relationship with each other, are typically exchanged on a regular basis. Furthermore, a node, particularly a node functioning as a parent node, typically estimates on a regular basis or based on triggered conditions its uplink bandwidth. Such trigger conditions may include when the node accepts an attachment request from a joining node, when the node detects that a child node has departed from the multicast tree, or based on user-demand. Trigger conditions may also be based on a number of factors, which may include the network condition and/or resources available at the node. In general, the more frequent the heartbeat messages are exchanged, the more network traffic there is in the network. In some embodiments, heartbeat messages may be exchanged once every second, for example. Furthermore, in some embodiments, that one second interval may be used for generating and replying to heartbeat messages. In some embodiments, the interval between heartbeat messages are small enough so as to enable a system's local information, e.g., the subtree size and node addresses along the path from each node to the video source node, be updated frequently.

During heartbeat message exchanges, the parent node 410 typically informs 430 its child node 420 of the parent node's estimated available bandwidth, particularly uplink bandwidth. If the parent node has several child nodes, the parent node typically transmits a heartbeat message to each of its child nodes on a regular basis. The timing of when each heartbeat message is sent to each child may vary. The child node 420 may also locally store information derived from these received heartbeat messages, so as to enable the child node to transmit information, for example, most recent parent bandwidth available information, to the RP during a controlled graceful departure. The information may be stored, for example, in a data store, such as a database or table, which may be in volatile or non-volatile memory.

In some embodiments, the heartbeat messages are first generated by child nodes. The parent nodes in turn then respond to these heartbeat messages, with information as exemplified, for their respective child nodes. By such heartbeat message exchange, child nodes are able to inform their parent nodes of their existence. Furthermore, child nodes may also detect ungraceful departures of parent nodes, e.g., via missing video packets, which are supposed to arrive at the child nodes at certain times.

The child node 420 may also accordingly transmit, typically on a regular basis, heartbeat messages 440 to all of its parent nodes, indicating to the parent node that the child is still part of the multicast tree. The timing of when each child-to-parent heartbeat message is sent to each parent may vary. Typically, the message from the child to a parent node may be used by the parent node to detect if a child node ungracefully departed from the multicast tree. The heartbeat message 440 from a child node 420 to a parent node 410 may just indicate that the child node is still attached to the parent, for example. In some embodiments, only parent nodes transmit heartbeat messages to their child nodes. In other embodiments, only child nodes transmit heartbeat messages to their parents.

Departure Messages: Graceful and Ungraceful Departure Messages

A node generally may depart from a multicast tree in a graceful or ungraceful manner. Typically, a graceful departure involves having the departing node inform the RP and/or its parent node(s) that the departing node is departing or detaching from the multicast tree(s). An ungraceful departure, on the other hand, generally relates to a node leaving/departing without informing the RP and/or its parent node(s) that the node is detaching from the multicast tree(s).

Figure 5A:
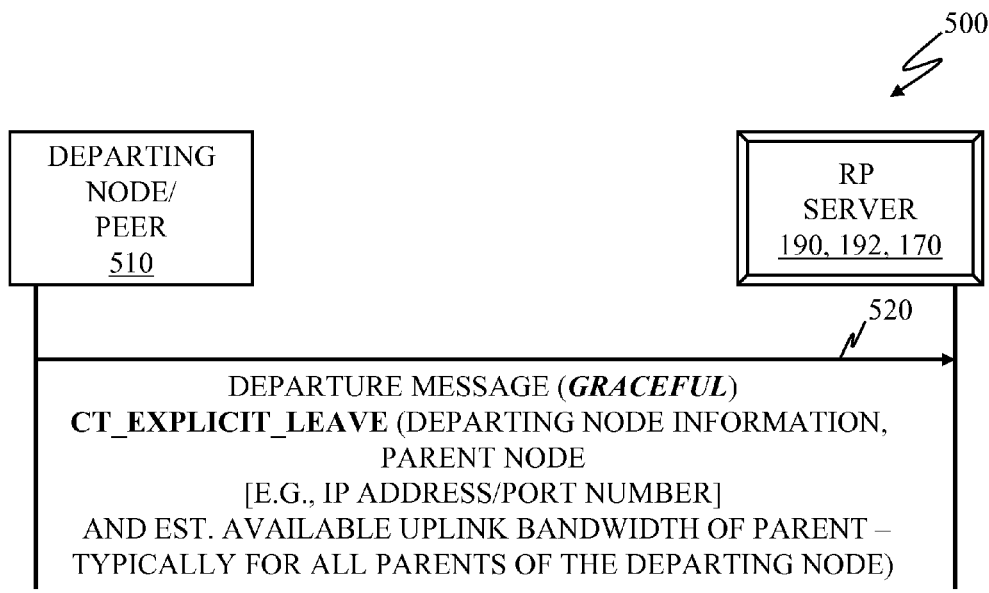
FIGS. 5A and 5B are exemplary data flows of graceful departure messages, according to embodiments of the invention.

FIG. 5A is an exemplary data flow 500 illustrating a graceful departure message transmission from a departing node 510 to the RP 190, 192, 170. Typically, the departing node is a child node of one or more parent nodes. The graceful departure message may include that departing child node information, e.g., IP address/port number, parent information of typically all parent(s) of that departing node, such as each parent's IP address and port number or other node-identifying information, and each parent's most recently provided uplink bandwidth information. The most recently provided parent uplink bandwidth information of each parent node may have been derived from the most recent heartbeat message 430 previously transmitted by that parent 410 and received by the now departing node 420. The exemplary graceful departure message 520, e.g., CT_EXPLICIT_LEAVE, may be transmitted in one or multiple packets or messages. Typically, once the RP receives a graceful departure message 520, the RP accordingly updates its database, e.g., PPC and membership information. This update typically includes removing the departing node from the appropriate multicast tree(s) if present—e.g., deleting entries representing parent-child relationship between nodes, and updating the available bandwidth and last update time of parent nodes included in the graceful departure message. This way, the RP may have access to typically the most recent available bandwidth information transmitted by each parent node. A departure message, in general, indicates a node in a state of departure indicating, for example, the node has departed, is departing, or will be departing from the multicast group.

Figure 5B:
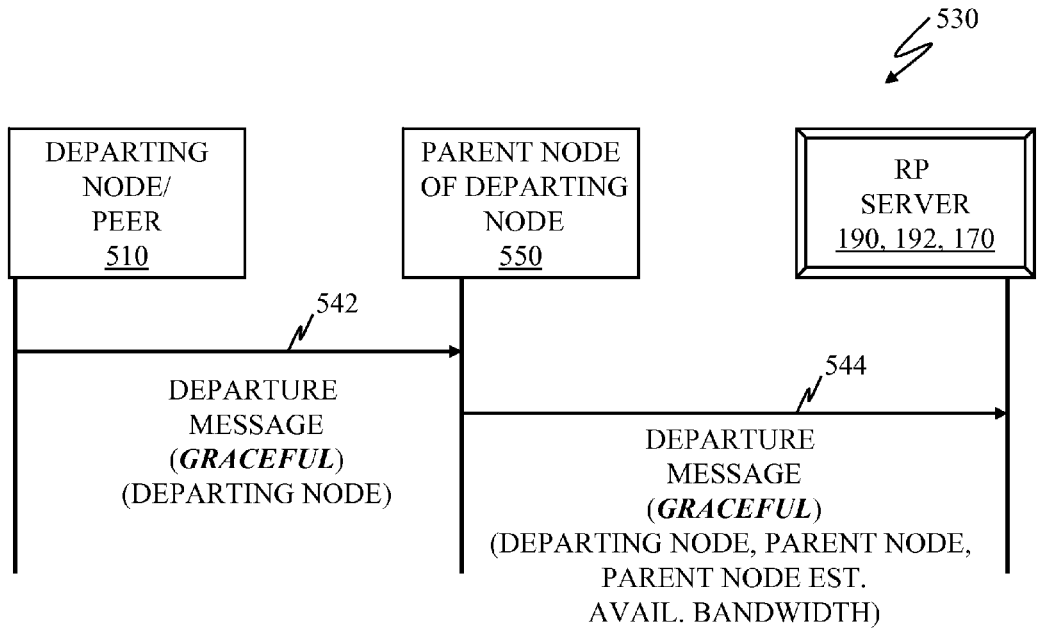

FIG. 5B is another exemplary data flow 530 illustrating a graceful departure, where a parent node 550 is used as an intermediary. In general, the parent node of the departing child node receives an initial graceful departure message 542 from the departing node. This initial graceful departure message typically contains the departing node's address or other node-identifying information. The departing node information, as one of ordinary skill in the art may appreciate, may be part of packet header information. The parent node 550 in turn transmits a graceful departure message 544 to the RP 190, 192, 170, which may include the departing node's 510 address, the transmitting parent's 550 estimated available bandwidth, and the transmitting parent's node-identification information.

Figure 5C:
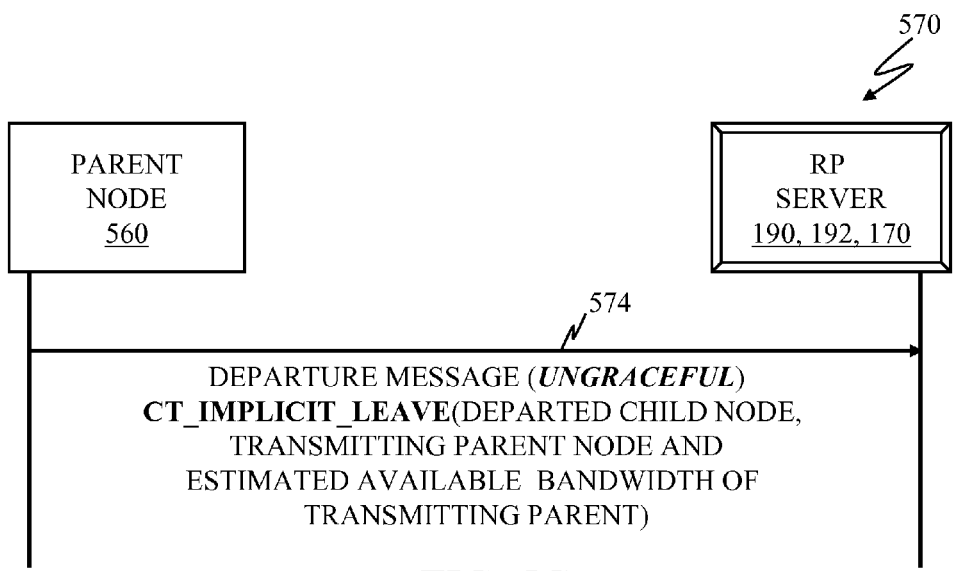
FIG. 5C is an exemplary data flow of an ungraceful departure message, according to an embodiment of the invention.

FIG. 5C is an exemplary data flow 570 illustrating an ungraceful departure message transmitted by a parent node 560 which has determined that a child node is no longer communicating in the multicast. This determination process is typically based on child-to-parent heartbeat messages. Typically, a timer-like process is implemented such that if a heartbeat message is not received from a child node after the timer has expired or within a defined time interval, the parent node accordingly assumes and reports, e.g., via the ungraceful departure message 574, that the child node has departed from or is no longer part of the multicast tree. As discussed above, a child node typically periodically transmits a heartbeat message to each of its parent nodes.

An exemplary ungraceful departure message, e.g., CT_IMPLICIT_LEAVE, may include the address or identification information of the child node monitored and determined to be no longer part of the multicast tree, and the transmitting parent information, including the parent's estimated available uplink bandwidth and node-identification information, e.g., IP address. Once the RP 190, 192, 170, receives this ungraceful departure message, the RP removes the determined departed child node from the appropriate multicast/overlay tree(s), e.g., membership information, and also accordingly updates the PPC, particularly the available bandwidth of the transmitting parent node.

Figure 6:
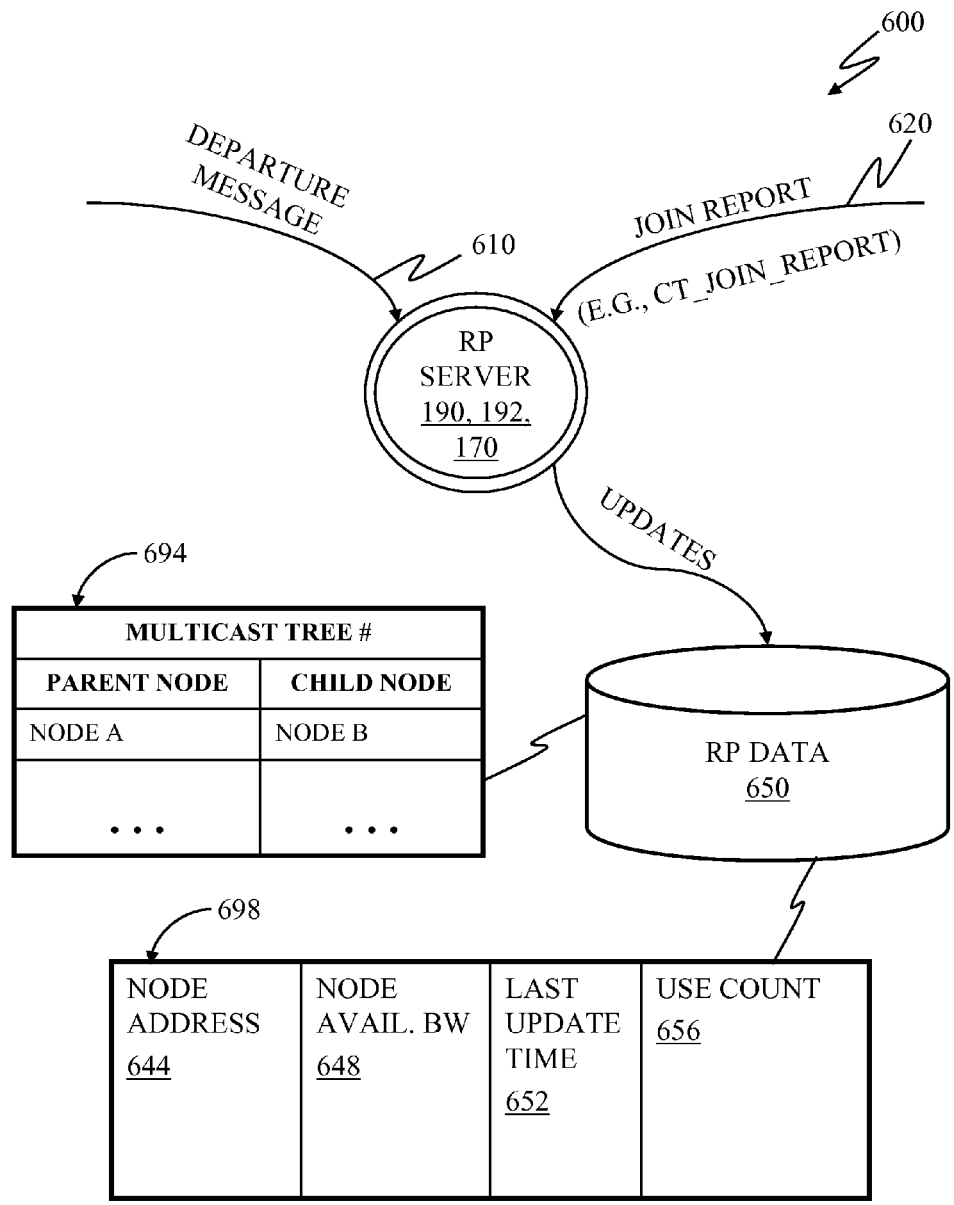
FIG. 6 is a diagram illustrating an exemplary data flow, according to an embodiment of the invention.

FIG. 6 is a diagram illustrating an exemplary data flow 600, according to an embodiment of the invention. Generally the RP 190, 192, 170, after receiving a departure control message 610, ungraceful or graceful, or a Join Report 620 indicating that the node has been attached to one or more parents, updates its RP information 650, which may include membership information 694 and PPC information 698. This update may include writing/adding, deleting, and modifying information. The membership information may include parent-child relationships and may also include multicast tree information, so as to distinguish within the multicast group one multicast tree from another, e.g., similar to the tables 294, 298 illustrated in FIG. 2. In some embodiments, the membership information may also be embodied or incorporated within the PPC information. One of ordinary skill in the art will appreciate that data processed by the RP may be embodied in many ways.

An exemplary PPC entry 698 may include the following exemplary fields:

a) Node Address 644: node address or any other node-identifying information, e.g., IP address and port number, of the node. This node typically has an available bandwidth adapted to serve at least one substream or stream;

b) Available Bandwidth 648: the estimated available bandwidth of the node, based on messages or reports received by the RP;

c) Update Time 652: the last update time indicating when the available bandwidth field 648 of that node was last updated, which may include writing, deleting, or modifying the entry; and d) Use Count 656: the number of times this node entry is distributed in a PPL i.e., sent by the RP to a node requesting a PPL message or wishing to join, since the last update of this entry. The Use Count is typically reset to zero when a corresponding entry, e.g., Update Time, is updated as described in (c) above. Based on data modeling design, each entry may also include a Multicast Tree Identifier field, not shown, to distinguish nodes within each tree. The PPC 698 typically contains entries of nodes from which the RP selects and creates the PPL.

Figure 7:
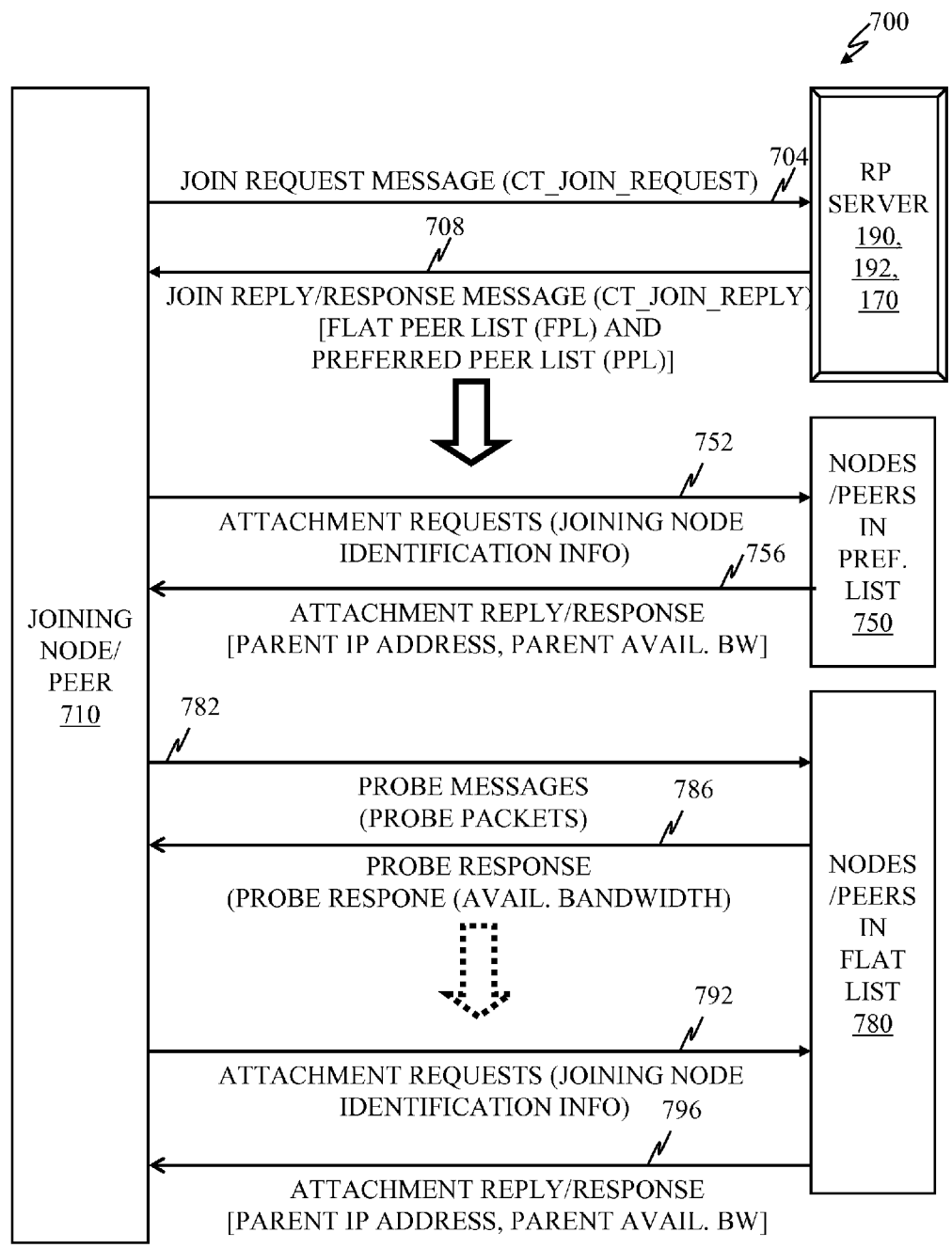
FIG. 7 is a high-level exemplary data flow diagram of exemplary messages exchanged in a multicast joining or rejoining process, according to embodiments of the invention.

Joining a Multicast Tree:

FIG. 7 is a high-level exemplary data flow diagram 700 of exemplary messages exchanged in a multicast joining, which may include a rejoining process. Typically a node rejoins, when that node gets disconnected or detached from its parent(s) in a distribution or multicast tree. Typically the rejoining node reconnects or reattaches to the same parents of the multicast tree(s) to which that node was previously attached. When a new node or peer 710 wants to join the overlay or multicast, that joining node typically first contacts the RP 190, 192, 170 and transmits a join request, e.g., CT_JOIN_REQUEST message 704. This message typically indicates that the joining node wants to join the multicast group. When the RP receives this join request, the RP in turn typically responds by sending to the joining node 710 a flat peer list (FPL) and a preferred peer list (PPL) via a join response message 708, for example, a CT_JOIN_REQUEST_REPLY, to the joining peer. In some embodiments the PPL is sent only for an initial join of a joining node but not for a rejoin request. Generally, a PPL is generated from the PPC and transmitted for each join request message, e.g., one PPL is generated per join request. A PPL, however in some cases, may not be retransmitted and/or regenerated if the join request is actually a rejoin. In some embodiments, a FPL is generated per join request.

When the joining peer receives the join response message 708, the joining node then transmits attachment requests 752 to some or all of the nodes 750 contained in the PPL, requesting that the joining node be attached to those nodes 750 as a child node. In some embodiments, all the attachment requests 752 are sent in parallel. In this embodiment, the attachment requests may all be sent in parallel without waiting for feedback or response from any of the potential parent nodes 750 from the PPL. In alternative embodiments, the attachment requests 752 are sent sequentially. In the case of sequential attempts, if the joining node receives a rejection for an attachment request from a candidate node 750, the joining node then transmits a parent-attachment request to another or next node from the PPL, until all the nodes listed in the PPL have been sent an attachment request or until the joining node has been attached to a defined number of multicast trees in the multicast group, typically to all trees. In other embodiments, a mixed parallel and sequential approach may be used. In some embodiments, the choice between sequential and parallel may be based on the number of entries in the PPL and the number of overlay/multicast trees with which the joining node has to join. A parent node 750 receiving an attachment request 752 may accordingly respond with an attachment response 756, indicating the grant or rejection of such request, which may include parent node information, e.g., IP address, and parent available bandwidth.

Typically, the PPL is used by the joining node 710 to attach to initial parents. In some embodiments, in parallel to these attachment requests to the PPL candidate nodes 752, the joining node may also probe FPL candidate nodes. The probe messages 782 may be performed in parallel with the transmission of the attachment requests 752 or immediately after. In some embodiments, the joining node probes the nodes 780 in the FPL by setting up and transmitting probe messages with associated probe timers 782. These probe messages 782 typically request the nodes in the FPL 780 to transmit back a probe reply 786 in response to the probe message 782. The probe response 786 may include the replying node's estimated available bandwidth or other status information. Considering that some of the candidate parent nodes in the FPL may have already left/departed from the multicast group or may be temporarily unavailable, these unavailable candidate nodes in the FPL 780 thus do not respond. The probe communication 782, 786 in general determines if the candidate parent nodes in the FPL are currently available or part of the multicast. Typically, the response 786 from the node has to be received and/or transmitted within a defined time, e.g., before a timer expires, for the responding node to be considered as available.

In some embodiments, parent attachment(s) to nodes in the PPL 750 may result in the joining node successfully connecting to all overlay multicast trees. In other cases, attachment requests to nodes in the PPL may only result in partial or no parent attachments, i.e., the joining node is not attached to all multicast trees. In this partial attachment scenario, the joining node may wait till the probe timer expires associated with the probe messages 782 prior to transmitting attachment requests 792, typically to those candidate nodes who have responded 786 to the probe messages 782 within a defined time interval, so as to enable the joining node to be attached to all multicast trees, for example. The nodes in the FPL accordingly respond with an attachment reply message 796, indicating whether the attachment request 792 by the joining node to attach as a child node, has been granted or rejected.

In other embodiments, the exchange of probe communication 782, 786 is not performed. In this embodiment, if the defined number of trees with which the joining node has to attach, has not been satisfied, the joining node in turn transmits an attachment request 792, 796 to some or all of the candidate parents in the FPL 780. These attachment requests 792 may be sent in parallel or sequentially, as described above. An attachment response 796, similar to those transmitted by the nodes in the PPL 756, typically if granted, also includes the parent node-identifying information and parent available bandwidth. In other embodiments, a grant or reject indicator is also included in the attachment response 756, 796.

In some embodiments, a parent node rejecting an attachment request 752, 792 may also transmit as part of its attachment response message 756, 796 its current available bandwidth to the rejected joining node. In this embodiment, a join report 350 transmitted by a child node to the RP, for example, may also include current available bandwidth information of nodes, which the child node was unable to join or attach.

i) Preferred Peer List with Parent Switch

Figure 8:
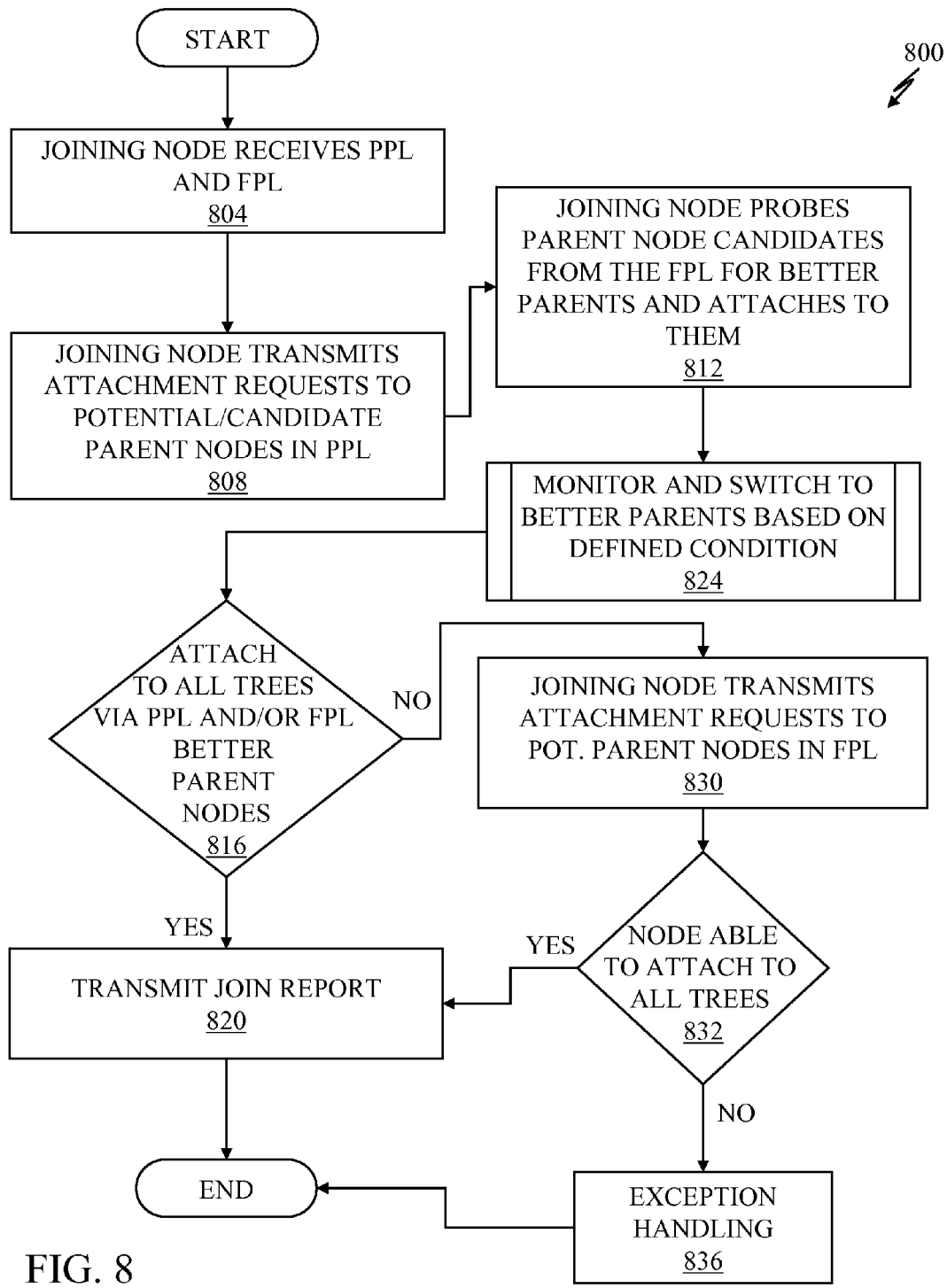
FIG. 8 is a high-level flowchart of another exemplary joining process, using a preferred peer list (PPL) with a parent-switch option, according to an embodiment of the present invention.

FIG. 8 is a flowchart of another exemplary joining process 800, using a PPL with a parent-switch option. This exemplary join process 800 is similar to the process 300 described in FIG. 3, but with variations. A variant approach may also use the PPL to join the multicast, as described above, followed by a process where some initial parents with which the joining node has been able to be attached—the joining node is now an attached node—are replaced by better parents, i.e., the now attached node is switched to one or more better parents. Typically, the joining node receives a PPL and a FPL in response 708 to a join request 704 submitted to an RP (step 804). Based on the PPL list, the joining node transmits attachment requests 752 to candidate nodes in the PPL requesting that the joining node be accepted as a child node (step 808). The candidate parent nodes also accordingly respond to the attachment requests 752 with attachment responses 756 (not shown). The joining node is then attached to all the parent nodes which granted the attachment request (not shown).

The candidate parent nodes in the FPL are also probed to determine whether these probed FPL candidate nodes may be considered as better parents (step 812). This probing process (step 812) is similar to the process of transmitting probe messages 782, 786 discussed in FIG. 7. The probed nodes in the FPL may respond with a probe reply 786 containing current status information, e.g., available bandwidth. Typically the probe messages are associated with a timer, similar to that discussed above. The joining node typically only waits for probe replies within the defined timer duration. Responses 786 transmitted and/or received after timer expiration may be ignored by the node. Based on the received probe responses 786, the joining node transmits attachment requests to the successfully probed nodes and accordingly is attached to parent nodes in the FPL that grant such attachment requests (step 812). In some embodiments, the step of probing nodes in the FPL (step 812) may be performed in parallel with the sending of attachment requests to nodes in the PPL (step 808). In this switching to a better parent embodiment, a child node may have two parents in the same multicast tree, typically for a temporary duration.

After performing the probe process and attachment process (step 812), the switch-to-better-parent process may be executed (step 824). This step (step 824) generally switches the attached child node or joining node to another parent deemed to be a better parent. The better parents are selected from the probed and attached nodes in the FPL that responded typically before the timer expires (step 812). A better parent may be based on a number of conditions.

Exemplary Better Parent Conditions:
 a) In one exemplary embodiment, the number of logical hops between the node and its parents may be applied as a criterion for switching parents. The number of hops between nodes may be provided or obtained as a part of the probe response. In some embodiments, all the current or attached parents, i.e., with which the joining node is attached, which are farther than a certain number of logical hops away or have a round-trip time (RTT) above some threshold may be switched to FPL parents identified through the probing and attaching process as parents which are less hops away from the joining node or have a smaller RTT. RTT is a type of proximity detection known to those of ordinary skill in the art.
 b) In another exemplary embodiment, the obtained video quality from the current or attached parents may be monitored and parents whose supplied video quality is below a defined threshold may be switched to better parents from the probed FPL nodes. The better parents may be based on a minimum hop distance away from child node, or based on a smaller RTT. Other conditions that may result in better data quality and/or response time may also be considered.

Assuming that a child has to be attached to all multicast trees, a determination is made whether the joining node is attached to all trees via PPL and/or FPL better-parent nodes (step 816). If the joining node is attached to all multicast trees via nodes from the PPL and/or FPL better nodes (step 816, "yes" branch), the joining node/attached node then transmits a Join Report to the RP (step 820). Otherwise (step 816, "no" branch), the joining node transmits parent attachment requests to potential parents selected from the FPL (step 830). If the joining node is attached to all trees, via PPL and/or FPL parents (step 832, "yes" branch), the joining node may then transmit a Join Report to the RP (step 820), otherwise (step 832, "no" branch), exception handling procedures 836, such as transmitting a new FPL to the joining node, having the joining node resubmit attachment requests, and other exception-handling procedures known to the those of ordinary skill in the art, may then be performed (step 836). One of ordinary skill in the art will appreciate that the timing to switch to better parents may be varied. For example, the switching to better parents 824 may be performed prior to submitting attachment request to the candidate nodes in the FPL or after the node is attached to all multicast trees in the multicast.

The better parent-switching process may optionally employ a soft-handover approach, which may help conserve node resources during the handover process. Because switching to a new parent may incur some delay, a manner of conserving resources so as to minimize performance and quality degradation may be implemented as part of the switching process. The exemplary soft handover process described below typically means that a new data path is established with the new parent, e.g., the better parent, prior to breaking the current receiving path, e.g., via the old parent. In general, the soft handover or soft handoff approach is to have a child node be connected to both the new and the old parents, and receive packets from both until the handoff is complete.

Figure 9:
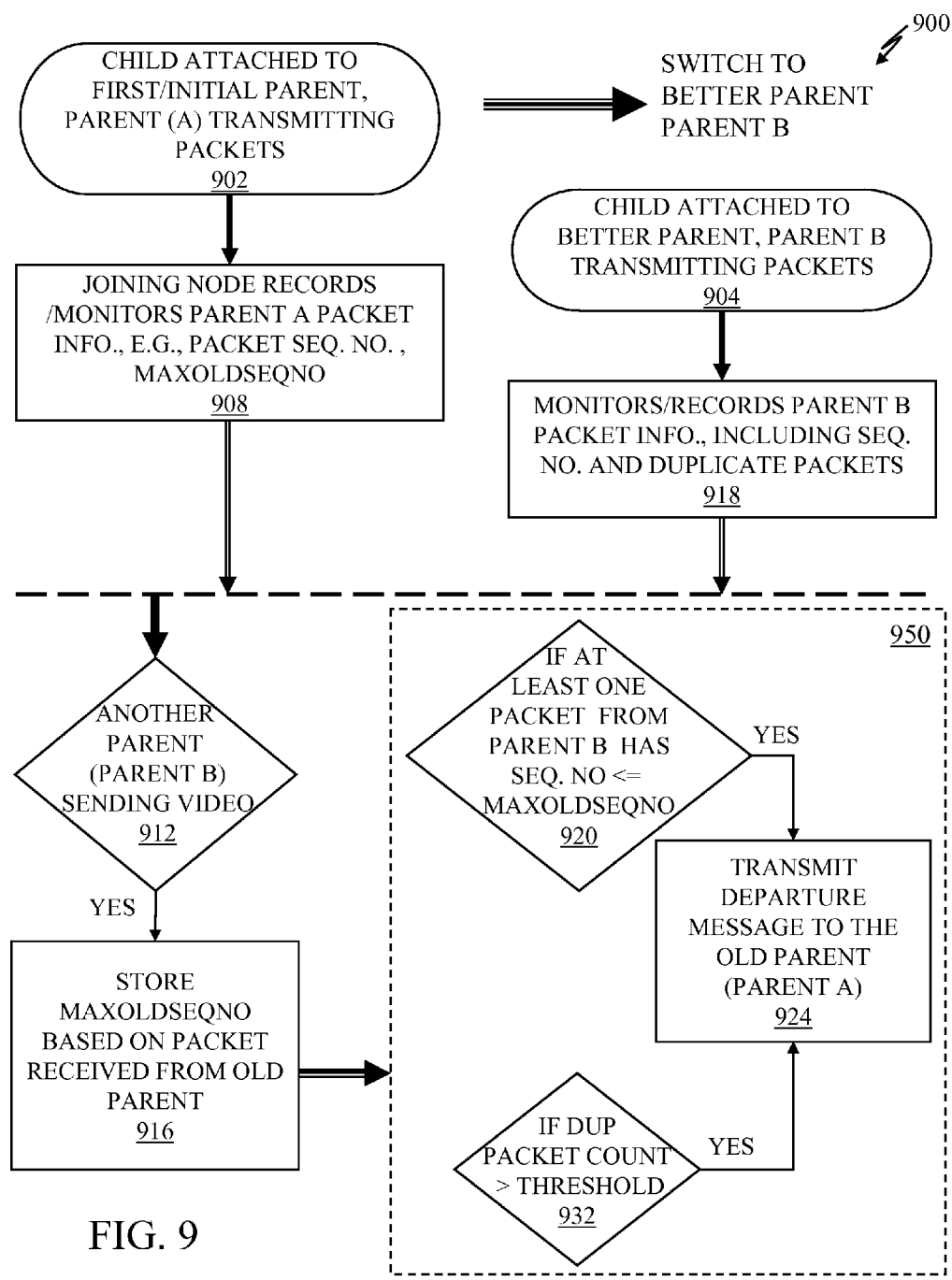
FIG. 9 is a high-level flowchart illustrating an exemplary soft handover or handoff approach, according to an embodiment of the invention.

FIG. 9 is a high-level flowchart illustrating an exemplary soft handover or handoff approach 900, according to an embodiment of the invention. Typically a handover process may be employed when a first parent node is designated to transmit a set of packets, and a second parent node is designated to transmit another set of packets, which may overlap with the set of packets transmitted by the first parent node. Typically, the first parent node is the initial parent, and the second parent node is the better parent node.

Once a parent node grants the attachment request from a joining child node, the joining child node may be attached to a multicast tree, via this initial parent node, e.g., selected from the PPL. For illustrative purpose, let us assume that it is Parent Node A. The now-attached child node may start receiving data packets, e.g., video packets, from Parent Node A 902. Each data packet is typically associated with a packet sequence number. Typically, data, such as a streaming source content, e.g., a video, is divided into multiple packets, with each packet having a packet sequence number. The sequence number is typically incremented by one for each data packet sent, e.g., real-time transport protocol (RTP) packets. The sequence number typically enables a receiver to detect packet loss and to restore packet sequence.

The now attached child node, e.g., via a handover module, starts recording or tracking packet information, e.g., packet sequence number, of packets received from Parent Node A, particularly, recording/tracking the highest or maximum sequence number received from that parent 908. This highest sequence number may be stored in a data store, e.g., memory variable, herein called MaxOldSeqNo. This variable typically indicates the highest packet sequence number received by the attached child node from Parent A. In some embodiments, a child node may receive packets out of order, e.g., a lower packet sequence number packet is received at a later time than a higher packet sequence number packet. In this embodiment, the earlier but higher packet sequence number is deemed to be the highest or maximum sequence number, and not the later but lower sequence number.

When an old parent, Parent A, is switched to a better parent, e.g., Parent Node B, Parent B, typically after attachment of the child node, may then start forwarding data, e.g., video packets, to the attached child node 904. The child node accordingly also monitors and/or records packet information, including packet sequence numbers and packets duplicated by Parent B 918. In some embodiments, for some time duration, the child node may receive packets from both the old parent, Parent A, and the better parent, Parent B. Packets 918 transmitted by both Parent A and Parent B are also monitored to determine if Parent A is sending packets that are also sent by Parent B. Packets duplicated by Parent B, for example, may be determined based on packet sequence number. The source or parent transmitter of a packet may be determined based on packet header information, for example. Some packet counters are also maintained as further explained below.

Once the child node detects that the child is receiving packets from another transmitter or parent, e.g., the better parent—Parent B (step 912, "yes" branch), the MAXOLDSEQNO associated with the old parent is stored (step 916), e.g., in memory. The child node, for example, the soft handover module in the child node, typically also monitors for conditions 950, which may trigger the child node to notify the old parent, Parent A, to stop transmitting or forwarding video packets to the child node.

If at least one packet received from the new parent, Parent B, has a packet sequence number that is less than or equal to the MAXOLDSEQNO, (step 920), the child node typically immediately transmits a graceful departure message to the old parent, Parent A, so that the old parent is notified to stop forwarding/transmitting video packets to the child node (step 924). This departure message, e.g., a graceful departure message, may be a similar departure message 542 exemplified in FIG. 5B. Parent A may also accordingly transmit a departure message 544 to the RP. In other embodiments, a counter is maintained which keeps track of the number of packets received from Packet B with packet sequence number less than or equal to MAXOLDSEQNO. If the count of these packets exceeds a defined threshold, the old parent is then immediately notified to stop transmitting to the child node (step 924).

If the packet sequence number of packets received from Parent B is greater than the value of MAXOLDSEQNO, the child node continues to record the sequence number of packets, e.g., video packets received from the new parent. At the same time, the child node identifies packets received from the old parent that are duplicates of the packets received from the new parent. If the count of these duplicate packets exceed a defined threshold (step 932), a departure message 542 is also sent to the old parent, thereby notifying the old parent, Parent A, to stop transmitting/forwarding data packets to the child node (step 924). Typically a counter is maintained/updated which counts the packets transmitted by Parent A that are duplicated by Parent B. This exemplary soft handoff process thus may conserve Parent A resources. The threshold for duplicate packets is typically a design parameter. If packet reordering due to network instability or sender-driven congestion-distortion optimized (CoDiO) scheduling is employed in the multicast, a higher duplicate count threshold may likely be desirable, for example The exemplary soft handover process exemplified herein is performed to promptly disconnect the child node from the old parent after the child node is determined to have received, from the old parent, all or substantially all the packets that the old parent is designated to transmit, which may not be transmitted by the new parent. In alternative embodiments, the handover module may use another approach to detect when the old parent has transmitted all or substantially all the packets that the new parent may not be instructed to send.

Figure 10:
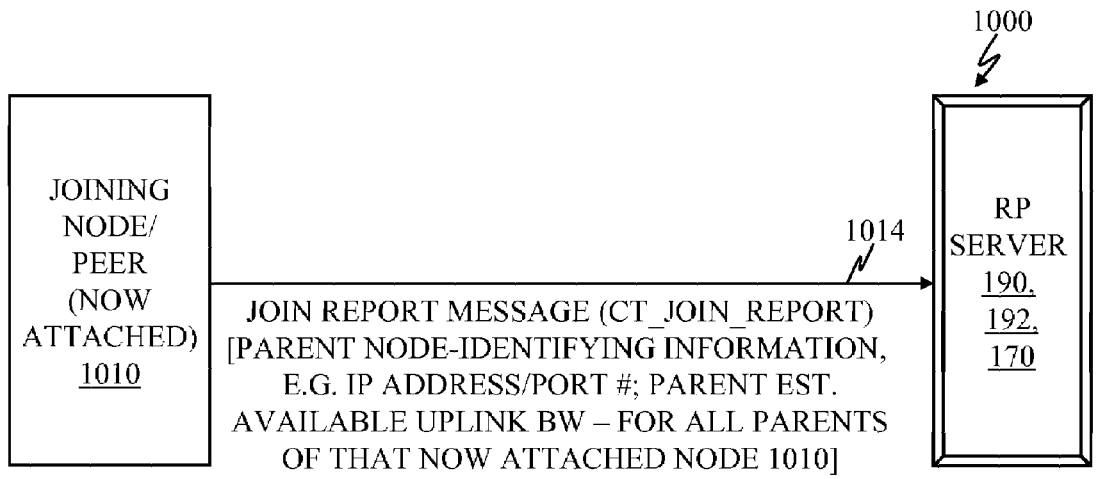
FIG. 10 is a data flow of an exemplary communication exchange between a joining node and a rendezvous point server (RP), according to an embodiment of the invention.

Successful Multicast/Overlay Tree Join:

FIG. 10 is a data flow of an exemplary communication exchange 1000 between a joining node 1010 and an RP 190, 192, 170, when the joining node 1010 is granted attachment to a defined number of, typically all, multicast trees, via the parent nodes contained in the PPL, FPL, or both. Typically, a joining node has to be attached to all multicast trees in the system.

After being granted permission to attach to all multicast trees, for example, the joining node, which is now a joined/attached node, 1010 transmits a Join Report 1014, e.g., via a CT_JOIN_REPORT message, to the RP. The exemplary CT_JOIN_REPORT message typically includes all parent node information of that attached node 1010, including, for example, parent IP addresses/port numbers and available bandwidths. The available bandwidth information of the parent nodes is based on or derived from the attachment response messages 756, 796 transmitted by the parent nodes when the parent nodes accepted or granted the joining node's attachment requests. A granting parent node, typically, transmits its parent node information, e.g., via a response message 756, 796, prior to forwarding data, e.g., video packets, to the now accepted joining node 1010.

Estimated Available Bandwidth (Updated and Non-updated Values):

In one embodiment, when nodes report the available bandwidth of their parents, or themselves, they may report updated bandwidth values. A child node, when transmitting, information to the RP or even to intermediary may also report its own available bandwidth. The updated bandwidth value includes additional bandwidth that may now be available. For example, when a node gracefully departs the multicast, that departing node may add the amount of bandwidth assigned to that departing node by its parents to the current available bandwidth of its parents. This updated bandwidth is the available bandwidth 520 provided to the RP, for example. Similarly, if a parent node is an intermediary 550, the parent node may report the updated bandwidth 544, which includes the previously allocated bandwidth of the departing node 510. Furthermore, when a parent node reports that a child node has been detected to have ungracefully departed or detached from the multicast, the reporting parent node may report this updated available bandwidth 574, considering that the reporting parent node may now use this additional bandwidth previously allocated to that detected ungracefully detached child.

In other embodiments, nodes may report non-updated values. Although, this may lower the possibility of having a node be registered or be entered in the PPC (e.g., PPC entries only include nodes that are adapted to support at least one single substream bandwidth or other defined condition), reporting of non-updated values, however, may increase join success to PPL parents, since the nodes registered in the PPC may have available bandwidth with higher probability of being able to support a joining node. Described in another way, parent nodes may report their old available uplink bandwidth, without reflecting the increase in their uplink bandwidth released by the departing child node. Such reporting policy may be seen as conservative, since the RP may remove the corresponding entries when the reported available bandwidth is below a threshold required for valid entries in PPC. New joining nodes thus may have higher chances to be attached to parent nodes recommended by PPL, since at the time of contacting the PPL parent nodes, they may have more available resources to accept new child nodes. This design choice may be considered as "conservative reporting."

Figure 11:
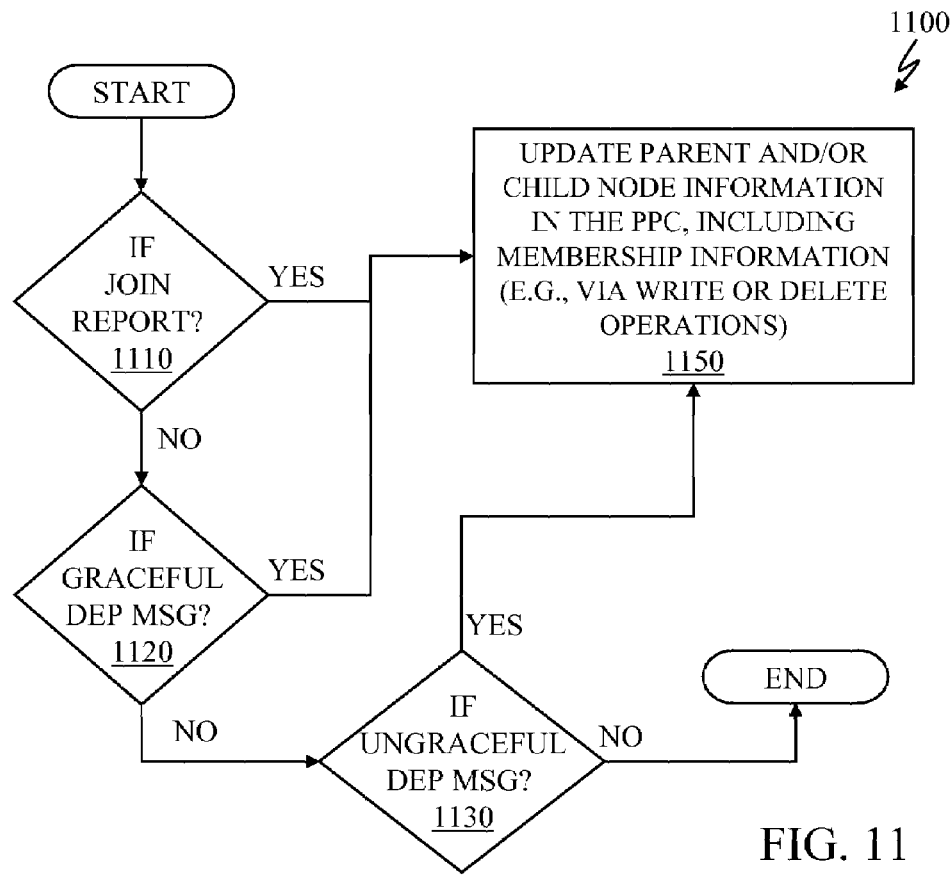
FIG. 11 is an exemplary flowchart illustrating when preferred peer cache (PPC) information may be updated, according to the embodiments of the invention.

Preferred Peer Cache (PPC):

FIG. 11 is an exemplary flowchart 1100 illustrating when PPC information may be updated, according to the embodiments of the invention. The PPC is typically updated by the associated RP (step 1150) when a join report (step 1110, "yes" branch, a graceful departure message (step 1120, "yes" branch), or an ungraceful departure message (step 1130, "yes" branch) is received by an RP.

If a Join Report, for example, is received, information about parent node(s) of a joined/attached node may be updated, including added, in the PPC. Membership information, such as parent-child relationship information may also be updated. If a graceful departure message is received by the RP, information about parent node(s) of the departed node may be updated. Membership information indicating that the departed node is no longer part of one or more multicast trees may also be updated. Similarly, if an ungraceful departure message is received, membership information is updated indicating that the node has departed. Information associated with the nodes reporting the ungraceful departure of such child node may accordingly also be updated.

i.) PPC Exemplary Design Parameters:

A) Preferred Peer Cache Size (e.g., PPC_SIZE):

A PPC size parameter, e.g. PPC_SIZE, in general defines the maximum number of entries within a PPC. In some embodiments, to control or provide good performance, the PPC_SIZE parameter may be a function of the number of multicast trees in the system or multicast. Typically, when a joining node sends a Join Report to the RP, the number of entries updated in the PPC is typically proportional to the number of parents or multicast trees, which may also translate to the same number of entries updated in the PPC. Departure messages, graceful or ungraceful, also typically result in updates to the same number or proportion of entries in the PPC.

In addition to the number of trees, the PPC_SIZE may also be chosen based on a node's join/leave rate and the overlay group size. The overlay group size may be based on the number of unique nodes in the multicast group. Join rate, for example, may be obtained by counting the number of new nodes joining, e.g., by tracking the join reports, over a time duration. Similarly, the leave rate may be obtained by tracking the number of nodes leaving or departing, e.g., based on graceful and ungraceful departure messages, over a time duration. Typically if nodes frequently join and depart/leave and the overlay group size is large, an RP typically accesses the PPC more frequently, as compared to a smaller join/leave rate or group size. In the exemplary simulation results further discussed below, a factor that may influence the PPC_SIZE size is the number of trees. The embodiments of the present invention thus may be scalable even when the group size increases.

B) Preferred Peer List Size (e.g., PPL_SIZE):

Based on simulations conducted, the Applicants observed that setting the PPL size parameter, e.g., PPL_SIZE, to one (1) to three (3) more than the number of multicast 15 trees may be a good design choice that may result to good network performance. For example, if the multicast group has five trees, there may be six to eight candidate parent nodes in the PPL, typically at least one for each tree, with one to three extra candidate nodes. A joining node may submit join requests to the extra node addresses in the PPL, particularly if the joining node is rejected by other nodes in the PPL. In these 20 embodiments, if there are additional available potential parent nodes in the PPL, the joining node may send out join requests to the extra available nodes in the PPL for that particular tree, for example. Other values of PPL_SIZE greater than the number of multicast trees may also be used.

C) PPC Update Timer

In some embodiments, a PPC update timer may be implemented, such that the PPC is updated regardless whether Join Reports or departure messages are received or not by the RP. This PPC update timer typically relates to the interval when stale entries in the PPC, as defined within the system, are discarded. The PPC update timer interval value may be based on the RP's workload, for example. Based on simulations, a value of one (1) second has been observed to work well. This interval value, however, may be further relaxed, so as to have a longer interval value, depending on the PPC_SIZE parameter value and refresh rate of the PPC entries. In general, it has been observed that the workload or resource to perform PPC update is negligible, as it only needs to discard stale entries. In the simulations discussed below, PPC entries older than 20 seconds—stale entries, e.g., the available bandwidth 648 field with information longer than 20 seconds, were discarded during these update intervals. In alternative embodiments, the update timer interval may be set based on the current time and the update time of the stalest entry in the PPC.

The various design parameters discussed herein, e.g., PPC_SIZE, PPL_SIZE, and PPC update time interval, may be adjusted on a periodic basis, on demand, or based on user's design constraints, for example.

ii) PPC Maintenance/Updates

Figure 12:
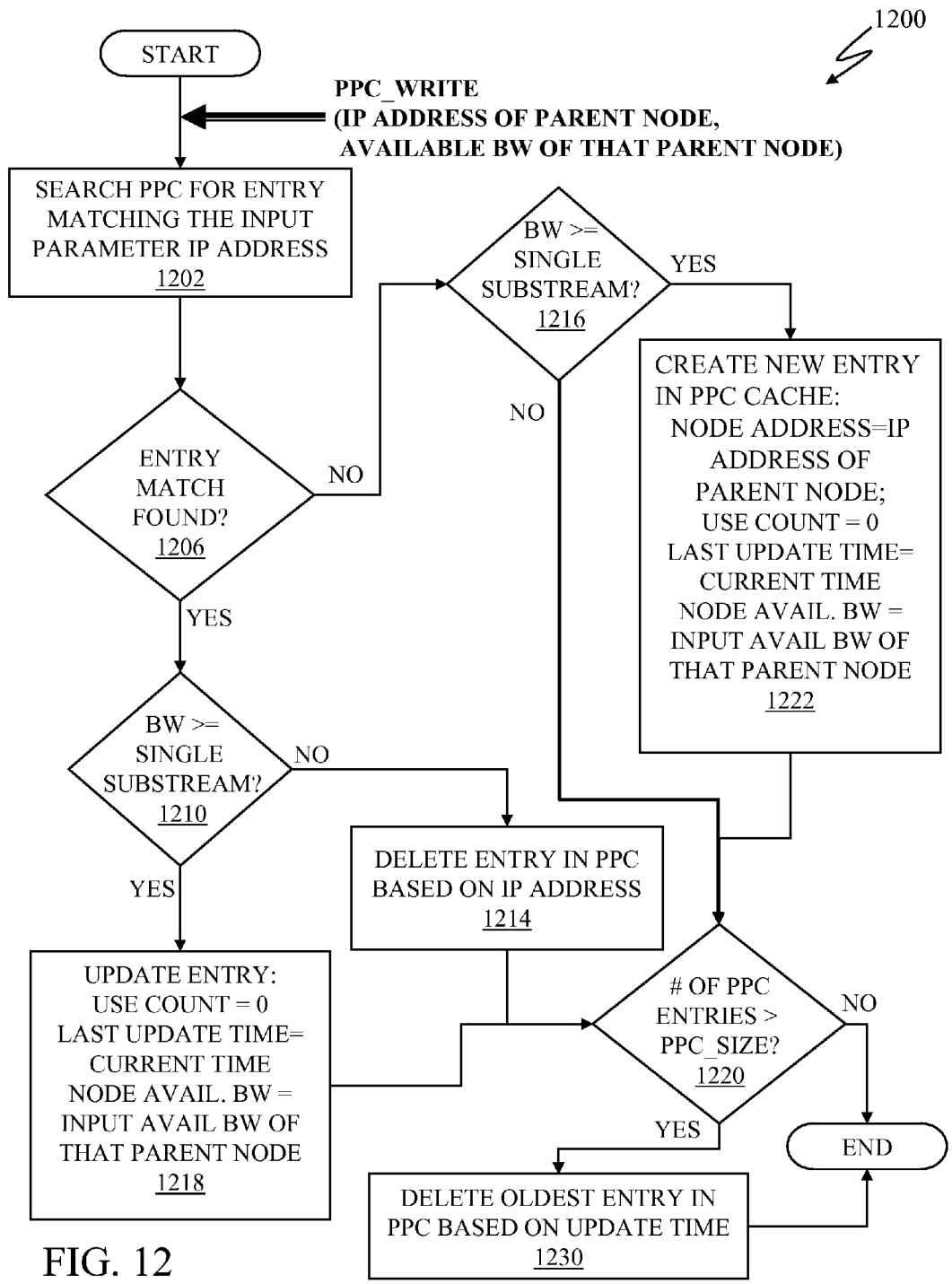
FIG. 12 is a high-level flowchart of an exemplary process for updating PPC information, according to an embodiment of the invention.

FIG. 12 is a high-level flowchart of an exemplary process 1200 for updating, including creating and maintaining, PPC information. In some embodiments, this may be performed via an exemplary write operation, e.g., PPC_Write. An exemplary write operation may include a number of input parameters, including node-identifying information, such as the IP address, of one or more parent nodes, and their associated available bandwidth values. Typically, the process described below is applied to each of the parent node input parameters.

The PPC_Write operation typically searches the PPC 698 for entries with an IP address, which may include the port number, matching the IP address of the input parameter. This input IP address parameter is an IP address of a parent node (step 1202). If an IP address match is found (step 1206, "yes" branch), another check is then made to determine if the available bandwidth of that input parameter parent node is greater than or equal to a single substream bandwidth, e.g., a bandwidth of a coded stream, or any other defined bandwidth condition. If the bandwidth (step 1210, "no" branch) is not greater or equal, for example, than the bandwidth of a single substream, the PPC entry with the matching IP address/node-identifying information is deleted from the PPC (step 1214).

Considering that the parent node is not currently adapted to support a single substream and/or another child, that node is deleted from the PPC so that it may not be included in the PPL. Otherwise (step 1210, "yes" branch), the write operation updates that matching IP address entry in the PPC by resetting the exemplary Use Count field 656 to zero (0), updating the Node Available Bandwidth (BW) field 648 to the estimated available bandwidth provided typically as an input parameter, which may be based on the Join Report or departure messages, and updating the Last Update Time field 652 to the current time (step 1218). The node information for that particular parent node is thus updated with the latest information. Typically, the Last Update Time field 652 is only updated when the Node Available BW field 648 is also updated.

If no matching IP address entry is found (step 1206, "no" branch), meaning the IP address node entry of that parent node does not exist, a check is then made to determine if the estimated available bandwidth for that parent node is greater than or equal to a single substream bandwidth or based on a defined condition (step 1216). If the bandwidth is greater than or equal to a single substream value or exceeds the defined condition (step 1216, "yes" branch), i.e., that node is currently adapted to support additional bandwidth or support another child, a new entry for that node parent is created in the PPC. The Node Address field 644 is set to the IP address of the input parameter parent node, the Use Count field 656 is set to zero, the Last Update Time 652 to the current time, and the Node Available Bandwidth 648 to the input parameter available bandwidth of that parent node (step 1222). No PPC entry is created if the input parent parameter node does not have available bandwidth to support, for example, a single sub-stream (step 1216, "no" branch).

On a periodic basis or as part of the exemplary write operation 1200, a check may also be made to determine if the number of PPC entries in the PPC exceed the PPC_SIZE parameter (step 1220). If the number of PPC entries is greater than PPC_SIZE or based on other conditions (step 1220, "yes" branch), one or more entries of the PPC are deleted until the number of entries in the PPC is within the defined condition (step 1230).

Typically the stalest or oldest entries, typically based on last update time 652, are first deleted or removed from the PPC (step 1230).

In some embodiments, when a Join Report is received, new node entries may be added to the PPC, e.g., via the exemplary write operations described above. The addition of PPC entries enables the PPC to be populated at a faster rate, particularly at the early stage of overlay or multicast group growth. This population of entries, however, may result in the PPC entries increasing rapidly particularly when many new nodes attach to the multicast group, e.g., during a flash crowd period. Flash crowd may occur, for example, when a scheduled video program/stream starts at its scheduled time, e.g., 8 p.m. In alternative embodiments, when a Join Report is received, only the existing entries in the PPC are updated and no new PPC entries are added. Even though the success rate of PPL-based first-attempt successful attachment to parents decreases if we allow entry addition when a Join Report is received, we observe the increase of the number of successful direct attachments to PPL parent nodes. In other embodiments, the periodic maintenance of the PPC may be performed based on the PPC update timer. If the PPC timer expires, stale PPC entries may be deleted as discussed above and the timer reset so as to schedule the next PPC update.

iii) Creation and Distribution of a PPL from the PPC

Figure 13:
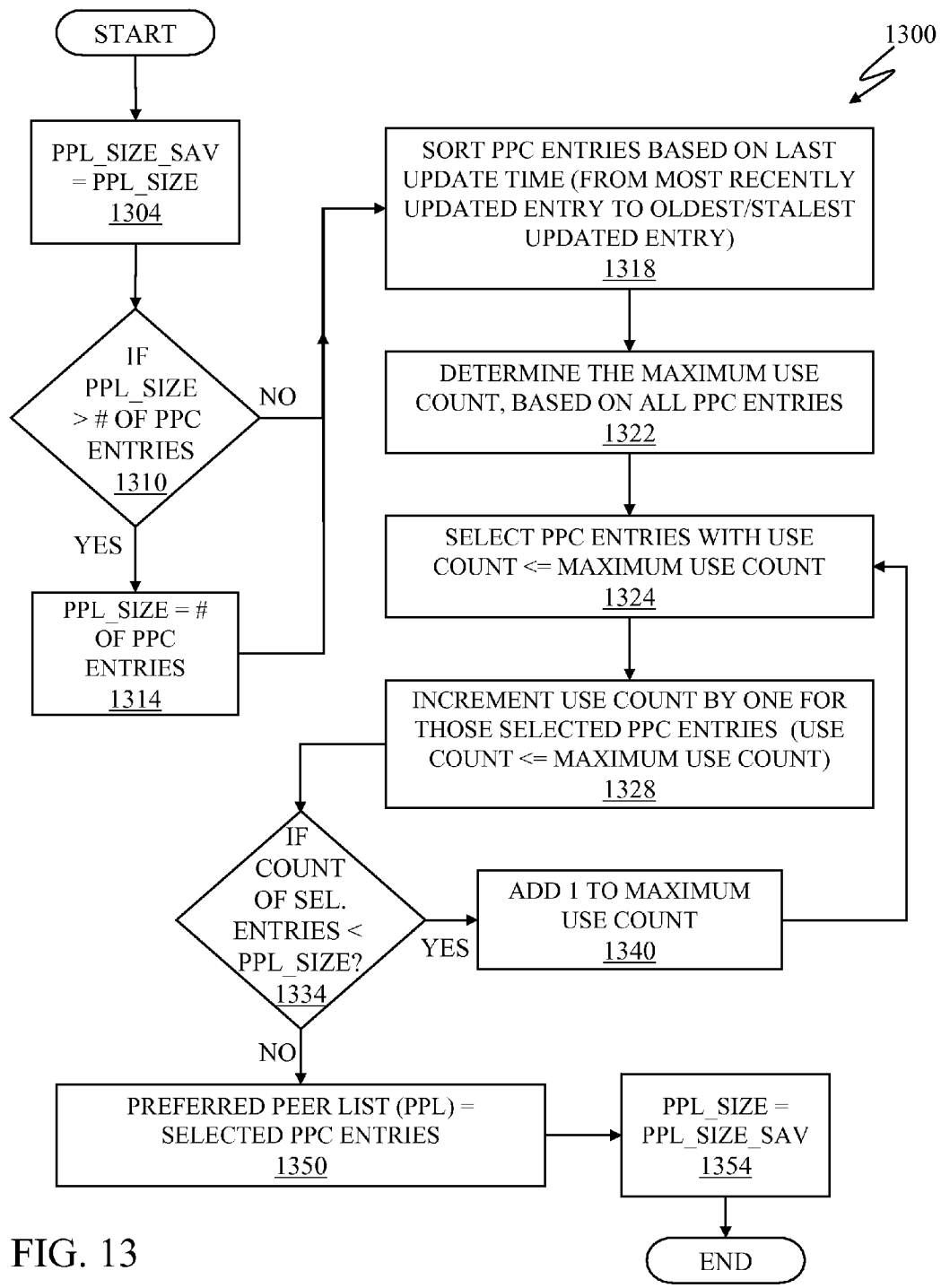
FIG. 13 is a high-level flowchart of an exemplary process of creating a PPL, according to an embodiment of the invention.

FIG. 13 is a high-level flowchart of an exemplary process 1300 of creating a PPL, which may be transmitted to a node as part of a Join Reply/Response message 708. In some embodiments, the number of entries in the PPL may be based on the PPL_SIZE parameter (described above) defined within the system.

In some embodiments, each PPC entry, i.e., any parent node in the PPC, is adapted to forward or transmit any multicast tree sub-stream or data. In simulations, this has been found to perform better than restricting a parent node to forward or transmit data for only one or more particular trees. In some embodiments, however, a parent node may provide a particular tree ID or identifier, indicating which tree sub-stream that parent is adapted to support or forward information.

As part of creating a PPL, the PPL_SIZE parameter as defined within the system may be saved to another variable, e.g., PPL_SIZE_SAV (step 1304). One of ordinary skill in the art will appreciate that the value of PPL_SIZE may be changed as network conditions change, for example, in response to the increase of the number of multicast trees. If the PPL_SIZE is greater than the number of current entries in the PPC (step 1310, "yes" branch), then the PPL_SIZE is set to the value equal to the number of current PPC entries (step 1314). The PPC entries are then sorted based on the last modification time, e.g., the Last Update Time field 652, from most recently updated to the oldest updated or stalest entry (step 1318). A maximum use count, e.g., MaxUseCount, based on the Use Count field 656 of all PPC entries, is then determined (step 1322). Typically, this means looking at each entry in the PPC and finding the greatest value contained in the Use Count field 656. From these sorted PPC entries (of step 1318), select a set of PPC entries who Use Count field value is less than or equal to the determined MaxUseCount. Each of the Use Count fields 656 of all the selected PPC entries (of step 1324) are updated by incrementing the value of that field 656 by one (step 1328). Typically, the Last Update Time 652 field is not updated. A check is then made to determine if the count or number of selected PPC entries (of step 1324) is less that the PPL_SIZE parameter (step 1334). If the count is less than the PPL_SIZE (step 1334, "yes" branch), the Maximum Use Count value, e.g., MaxUseCount, is incremented by one (step 1340). The selection process (step 1324), the update of the Use Count field for selected entries (step 1328), the verification of the count of selected entries (step 1334), and the increase of the Maximum Use Count (step 1340) are typically repeated until the count or number of selected PPC entries based on the Maximum Use Count value is equal to or greater than the PPL_SIZE. If the count of selected entries is equal to or greater than the PPL_SIZE (step 1334, "no" branch), i.e., the PPL is populated to the desired size from the PPC, the PPL is created (step 1350) and then transmitted to the node requesting to join the overlay group. The defined PPL_SIZE parameter may then be restored, e.g., PPL_SIZE =PPL_SIZE_SAV (step 1354).

The PPL (step 1350) created thus contains the most recently updated node information, according to the embodiments of the invention. Furthermore, a node requesting to join the multicast group typically receives a PPL, typically ordered from most recently updated to oldest updated entry. In some embodiments, the joining node sequentially transmits join requests to candidate nodes in the PPL order, thereby transmitting requests to typically most recently updated entries.

In other embodiments, a weighting factor is added in the process of selecting PPC entries to generate the PPL. For example, more weight may be assigned to candidate parent nodes with higher available bandwidth, thereby increasing their probability of being included in the PPL. In other embodiments, the age of the entry of the Use Count field and the amount of available bandwidth 648 may be combined together to determine what entries are to be added to the PPL from the PPC entries. In this latter embodiment, a Use Count update field may be added so as to keep track when the Use Count field was last updated.

Figure 14:
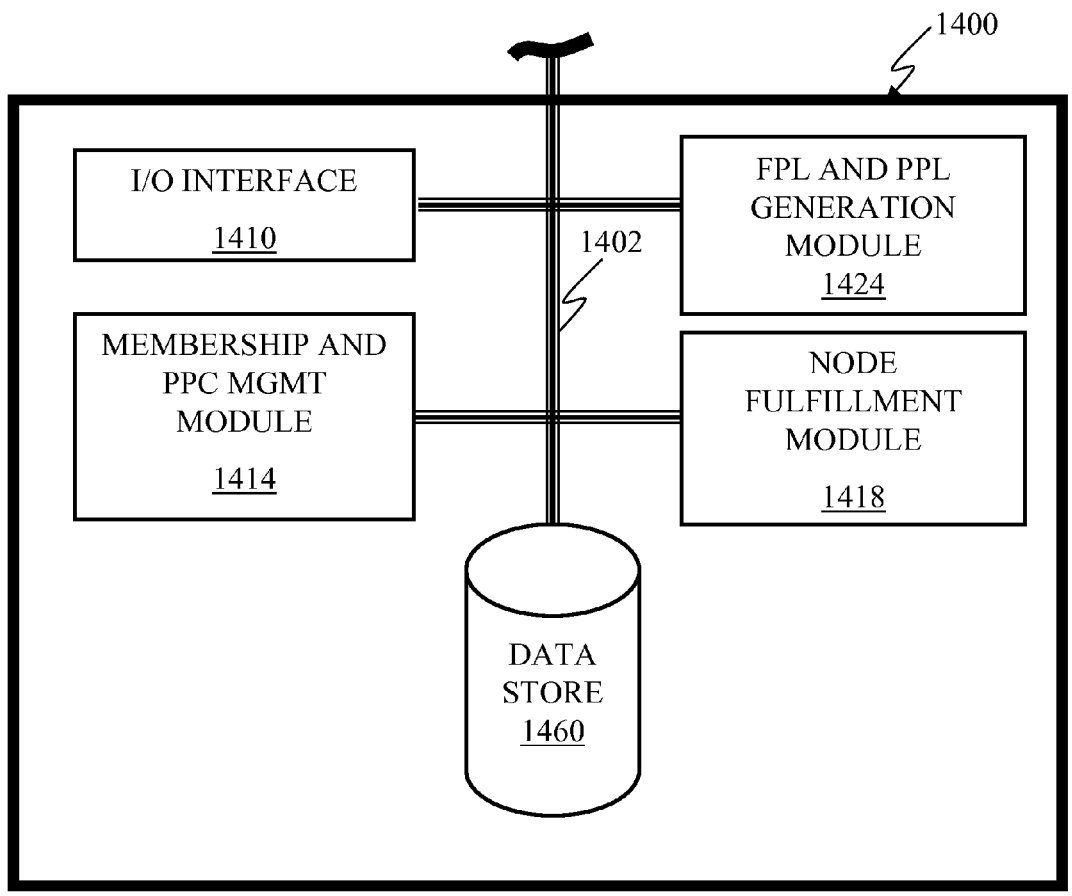
FIG. 14 is an exemplary RP, according to an embodiment of the invention.

FIG. 14 is an exemplary RP device 190, 192, 170, 1400 adapted to perform the exemplary joining and attachment process described herein using PPLs and/or FPLs. The exemplary RP 1400 typically includes an input/output I/O interface card 1410 adapted to enable the RP 1400 to communicate with other nodes in the system or multicast. The RP may also include a data store 1460, which may be volatile or non-volatile memory, for storing data, such as membership information, PPC entries, and design parameters. Such a data store may be local or remote to the RP. The exemplary RP may also include a membership and PPC management module 1414 adapted to update and maintain membership information, including tree information, and PPC entries, based on, for example, received Join Reports or departure messages. The RP may also include a node or peer fulfillment module 1418 adapted to receive join requests 704 from nodes, as well as transmit FPLs and PPLs. The FPL and PPL generation module 1424 is adapted to generate FPLs and PPLs from PPC entries, as described above. In some embodiments of the invention, the different modules in FIG. 14 may communicate and interface with each other via a bus, dedicated signal paths or one or more channels 1402.

Figure 15:
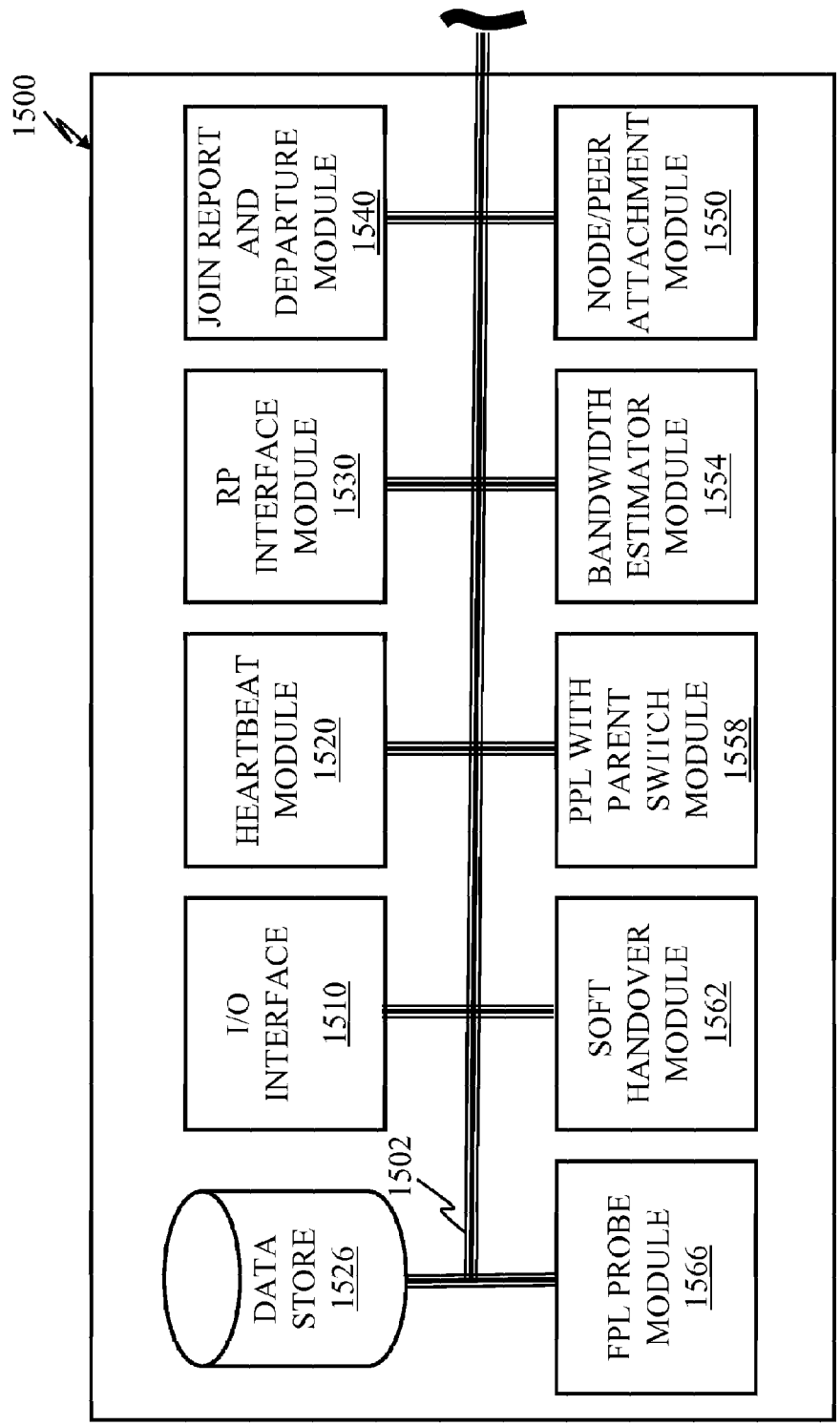
FIG. 15 is an exemplary node adapted to perform child and/or parent node processes, according to an embodiment of the invention.

FIG. 15 is an exemplary peer or node device 1500, 110, 114, 120, 124, 150, 144, 140, 134, 130 adapted to perform the parent and/or child node processes described herein. The exemplary node or peer 1500 typically includes an input/output I/O interface card 1510 adapted to enable the node 1500 to communicate with other nodes and the RP(s) in the system or multicast. The exemplary node or peer 1500 may also include a data store 1526, which may be volatile or non-volatile memory, for storing data, such as counters, packet sequence numbers, parent bandwidth information, parent and/or child information, and probe responses. Such a data store may be local or remote to the node. The exemplary node 1500 may also include a heartbeat module 1520 adapted to transmit and receive heartbeat messages within the system or multicast. The node 1500 may include a RP interface module 1530 adapted to communicate and interface with an RP, including transmit join requests and receive FPLs and PPLs. The node may also include a join report and departure module 1540 adapted to generate and transmit join reports and departure messages to the RP and/or intermediary parent nodes. The node may also include a node/peer attachment module 1550 adapted to transmit attachment requests and process received attachment responses to and from other nodes within the system. The node 1500 may also include a bandwidth estimator module 1554 adapted to estimate the node's available bandwidth, particularly its uplink bandwidth based on the child nodes supported, for example. The node 1500 may also include a PPL with parent switch module 1558 adapted to determine whether the node is to be attached to better parents and perform the processes so as to attach the node to the better parents. The soft handover module 1562 is adapted to perform a soft handover process so as to notify an old parent node to stop transmitting or forwarding data, as discussed above. The FPL probe module 1566 is adapted to perform the time probe processes described herein, including transmitting timer probe messages 782 and processing timer probe responses 786. In some embodiments of the invention, the different modules in FIG. 15 may communicate and interface with each other via a bus, dedicated signal paths or one or more channels 1502.

Depending on the function of the device 1400, 1500, other modules, including functions and capabilities, may be added or removed. Furthermore, the modules in the exemplary devices 1400, 1500 described herein may be further subdivided and combined with other functions so long as the function and processes described herein may be performed. The various modules may also be implemented in hardware, or a combination of hardware and software, i.e., firmware.

Simulation Results:

The PPL features described herein were implemented using Network Simulator (NS2), with some modifications. The NS2 network simulator may be obtained from http://www.isi.edu/nsnam/ns/. A number of simulations were performed to evaluate the reduction in overlay join latency using PPLs.

a) First-Tree Join/Attachment Time and Full-Connection Time

Two simulation scenarios were used:
i) Uniform bandwidth: All nodes have same uplink bandwidth (600 kbps) and downlink bandwidth (1024 kbps).
ii) Heterogeneous bandwidth: The uplink and downlink bandwidth distribution of peers/nodes used in the simulation is shown in Table I below. These values were based on values reported in the document entitled "Early Experience with an Internet Broadcast System based on Overlay Multicast," by Y. Chu, A. Ganjam, T. Ng, S. Rao, K. Sripanidkulchai, J. Zhan, and H. Zhang, in the Proceedings of USENIX'04, page 155170, June 2004.

TABLE I

Heterogeneous Bandwidth Values

| Downlink Bandwidth | Uplink Bandwidth | Percentage |
| --- | --- | --- |
| 512 Kb/s | 256 Kb/s | 56% |
| 3 Mb/s | 384 Kb/s | 21% |
| 1.5 Mb/s | 896 Kb/s | 9% |
| 20 Mb/s | 2 Mb/s | 3% |
| 20 Mb/s | 5 Mb/s | 11% |

To capture the properties of a peer-to-peer or multicast overlay system based on multiple multicast or distribution trees, two different types of join/attachment time were measured. The first-tree join time is measured from the time when a node starts-up, e.g., when the node initially transmits the join request to when that node successfully connects or attaches to one of the multiple multicast trees. The full-connection time may be measured from the time when the node starts-up to when that node successfully connects or attaches to all the multicast trees in the overlay group, and is adapted to receive all the video substreams, for example. In these simulations, no PPL refers to an exemplary system where only the FPL and probe replies received within the probe timer duration are used to determine with which FPL nodes to attach.

Figure 16A:
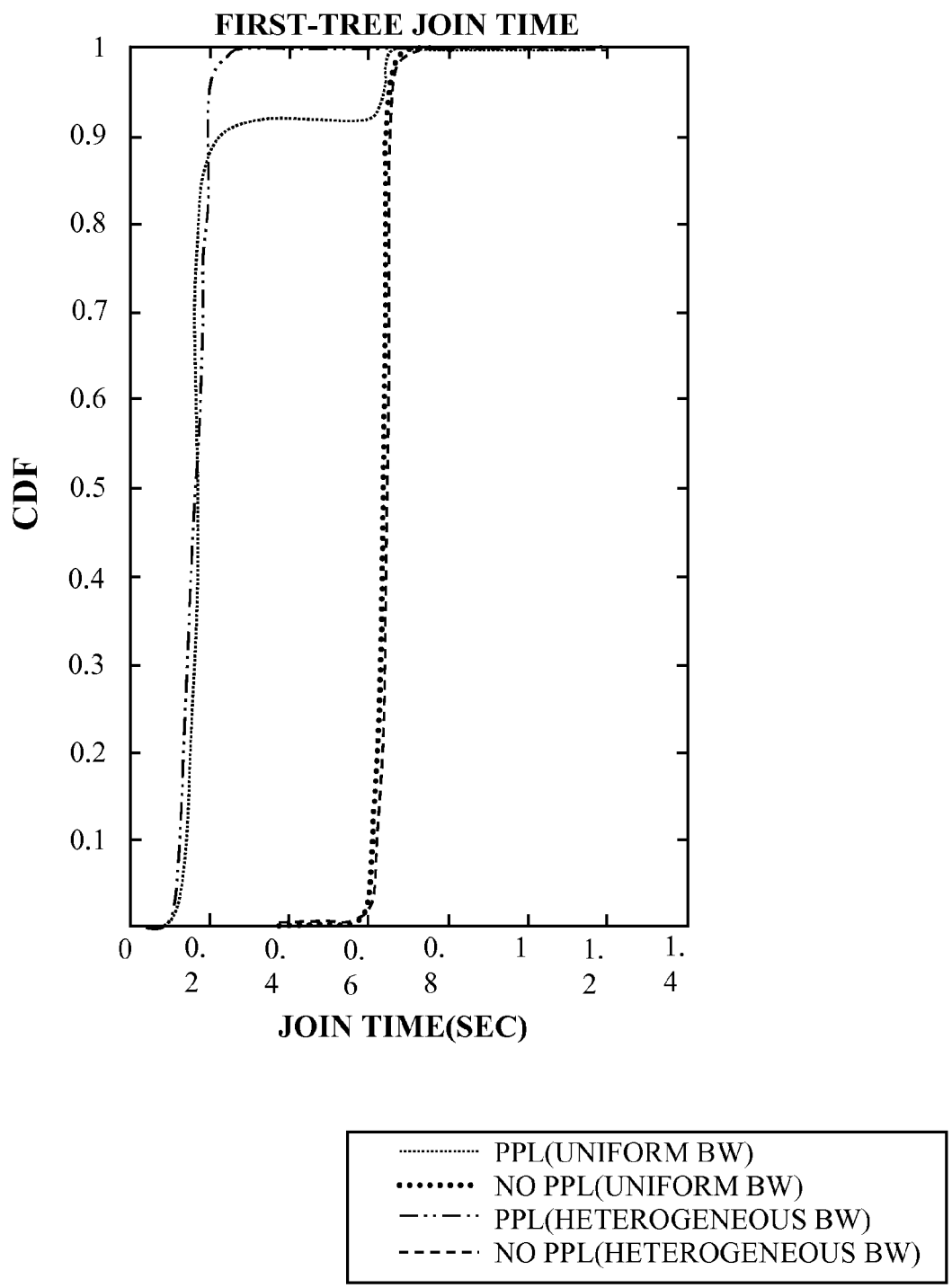
FIGS. 16A, 16B, 17, 18, and 19 are exemplary simulation results, according to embodiments of the present invention.
Figure 16B:
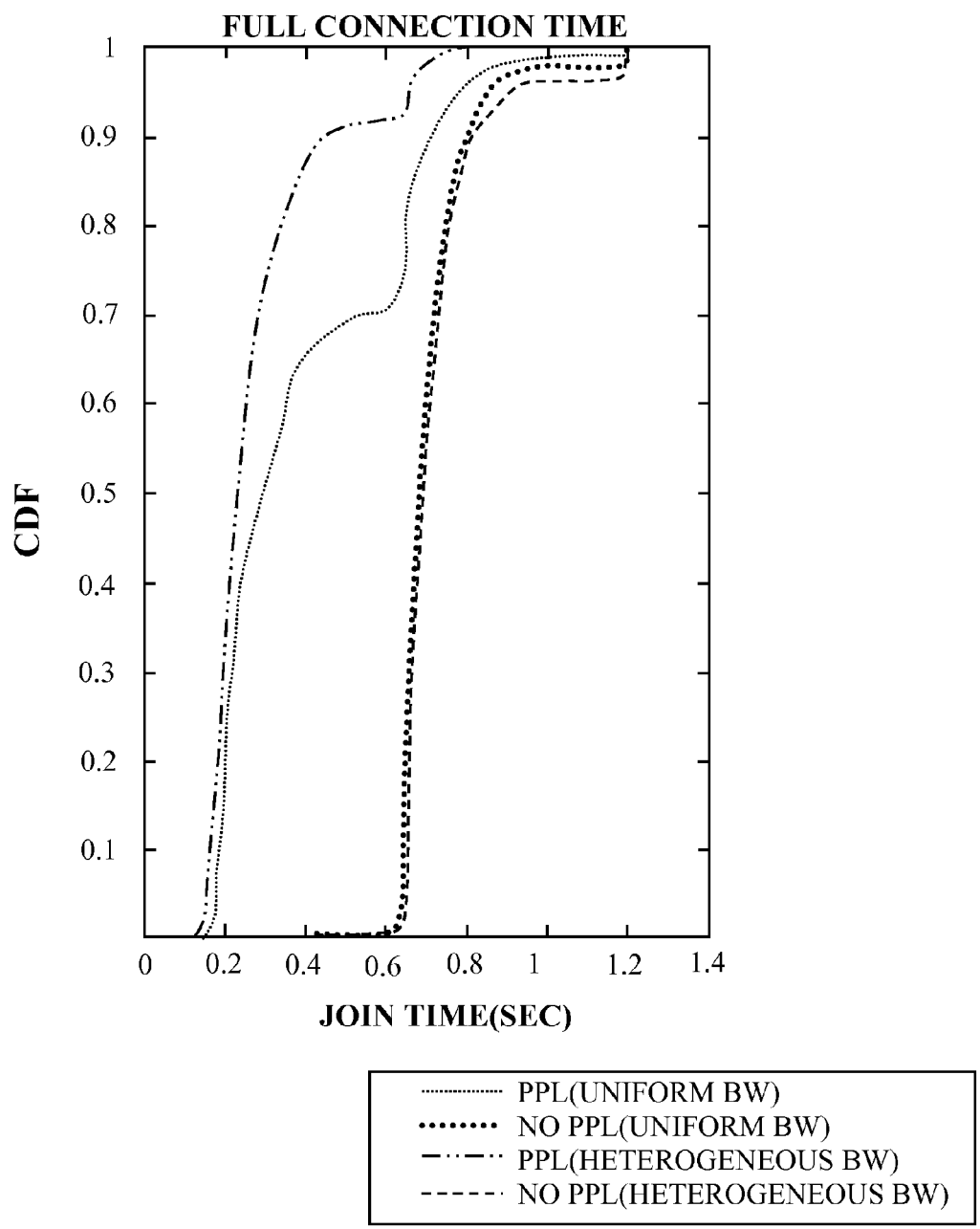

FIGS. 16A and 16B together contain two exemplary graphs showing the cumulative distribution function (CDF) of the first-tree join time and full-connection time for an exemplary case of 300 nodes, using PPL and not using PPL, for uniform and heterogeneous bandwidth scenarios. By providing PPL as the first list to choose candidate parents and by using the exemplary embodiments described herein, the PPL approach reduces both the first-tree join time and full-connection time, compared to not using the PPL list.

b) Latency Reduction of Individual Nodes

Figure 17:
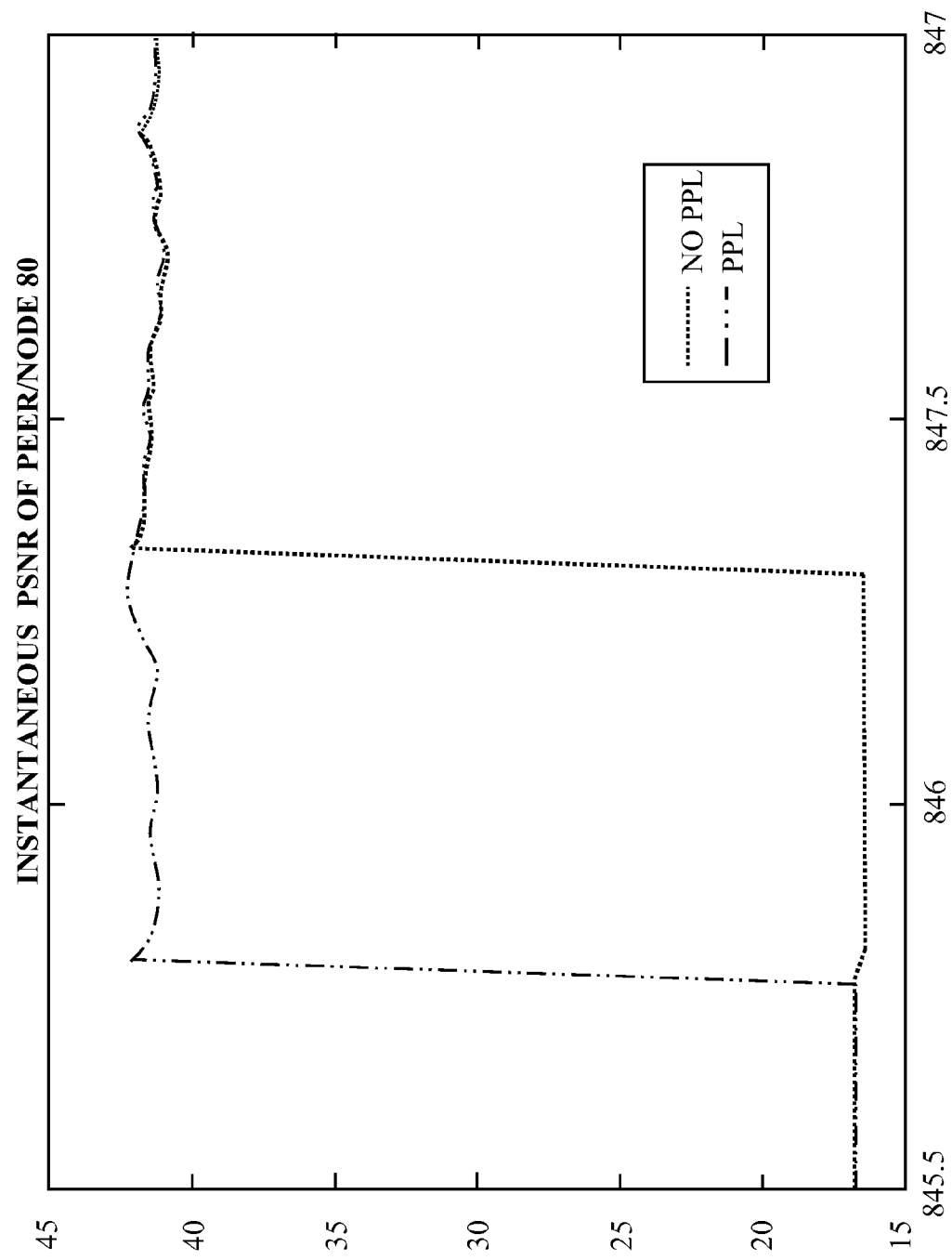
Figure 18:
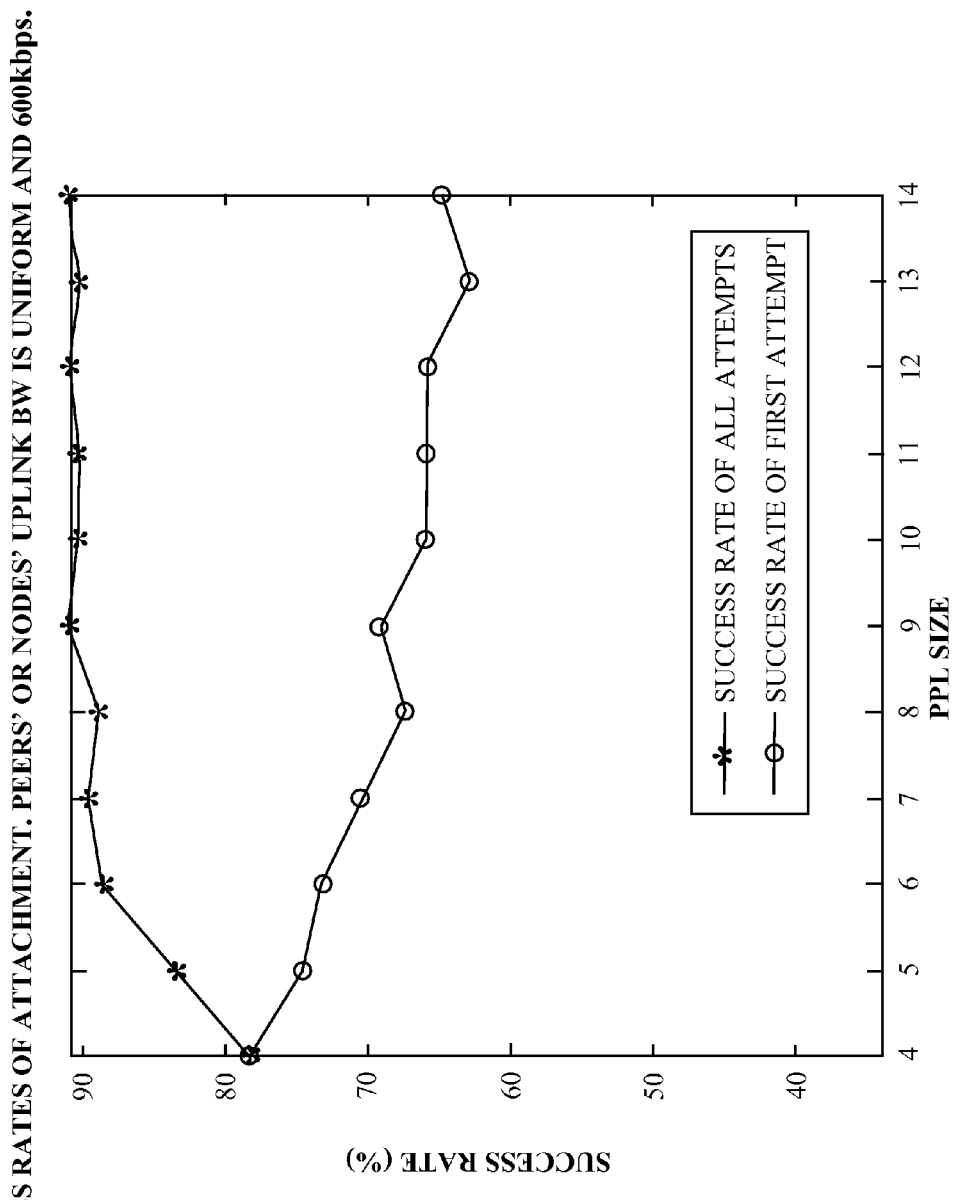

Based on the simulations, it has also been noted that using the PPL embodiments of the present invention may also result in better video quality for individual nodes. FIG. 17, for example, shows the instantaneous video quality in peak signal-to-noise ratio (PSNR) for a node/peer when employing PPL and processes of the present invention, and not employing PPL. Typically, the reduction in initial join time translates directly to faster startup of playing meaningful frames c) Effects of Sequential PPL-based Attachment Attempts In some embodiments, PPL-based probe-skip join success rate, e.g., successful direct attachment to a parent node, may be improved by enabling multiple attachment attempts if the attachment attempt to at least one tree or first multicast tree is rejected. FIG. 18 is an exemplary graph showing the results applying the sequential attachment request method described above. In the simulations, the joining node requesting attachment tries another node, e.g., node B. i.e., submits another attachment request, to another node in the PPL once a rejection for attachment is received from a first node, e.g., node A. Based on the exemplary results, sequential attempts may increase PPL-assisted join/attachment success rate by 12 to 15%. Although due to the aggressive aspects of sequential attachment attempts and when PPL size is increased, it may be observed that the success rate of attaching to the first multicast tree in the multicast decreases, but the success rate of attaching to all multicast trees in the multicast increases.

d) Performance of PPL with Parent Switch

The simulation scenario with uniform peer bandwidths was used with uplink bandwidth (600 kbps) and downlink bandwidth (1024 kbps). The PPL with parent switch approach, however, was employed.

Simulation setup: 75 peers, 900 seconds of session duration

Average PSNR values and average playout latencies for all peers are shown below.

As a video quality measurement, PSNR is computed over time for each node. Nodes begin to record PSNR when they are able to detect the full quality of video after they are connected to all trees in the multicast.

From the table below, the PSNR difference between no PPL and PPL with parent switch (PS) is rather small, whereas, the reduction of playout latency for PPL with parent switch compared to no PPL is up to 500 ms.

|  | No PPL | PPL | PPL w/PS |
|---|---|---|---|
| Average video quality | 40.44 dB | 40.05 dB | 40.37 dB |
| Average initial playout latency | 1.79 secs | 1.41 secs | 1.30 secs |

Figure 19:
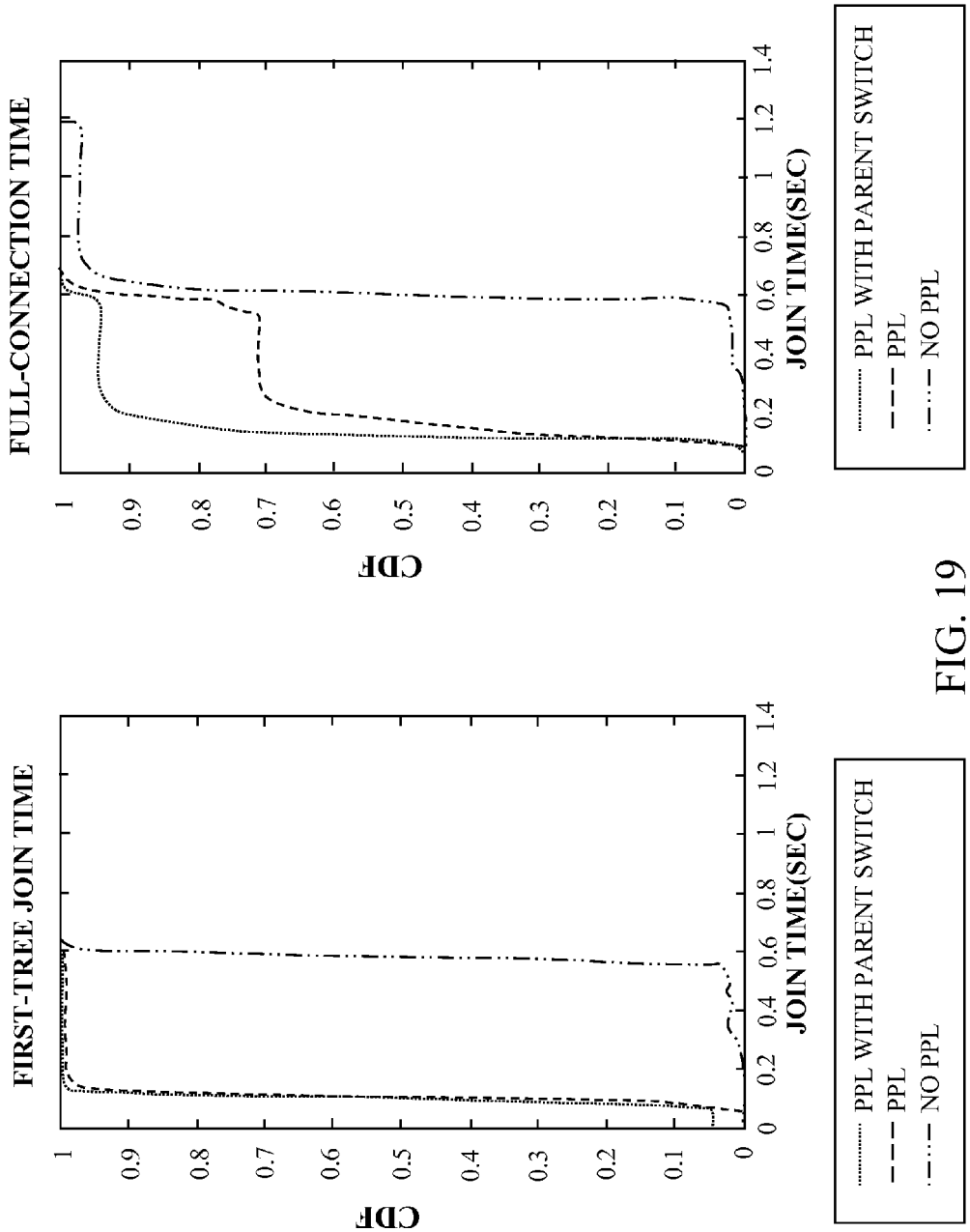

FIG. 19 shows CDF attachment-time plots. The left plot shows a first-tree attachment time and full-connection time for no PPL, PPL, and PPL with parent switch.

Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In particular, the operations and processes described herein may be varied, e.g., order change, and yet still be in the scope of the present invention. Furthermore, the embodiments of the present invention in addition to being applicable to video streaming may also apply to distributed simulations, video-conferencing, and multi-party games.

In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

We claim:

1. A method of processing in a multicast group, the method comprising the steps of:

maintaining, by a first device, a preferred peer cache (PPC) associated with the multicast group comprising one or more nodes, wherein the PPC comprises one or more preferred peer list (PPL) nodes, each of the PPL nodes is associated with a node from the one or more nodes of the multicast group and wherein each PPL node is associated with a node-identifying information, an estimated available bandwidth of said each PPL node, a use count, and one or more relationships between said each PPL node to another node of the one or more nodes in the multicast group;

updating, by the first device, the PPC if at least one of the following occurs:

a departure message is received indicating that a node of the one or more nodes of the multicast group is in a state of departure from the multicast group; and a join report message is received indicating that a new node has joined the multicast group to become a node of the one or more nodes of the multicast group;

receiving, by a second device, a preferred peer list (PPL), based on the PPC, comprising one or more PPL nodes, and a flat peer list (FPL) comprising one or more FPL nodes, wherein the one or more FPL nodes are randomly selected nodes from the one or more nodes of the multicast group; and transmitting, by the second device, an attachment request to at least one PPL node of the PPL.

2. The method of claim 1, wherein the step of transmitting, by the second device, the attachment request to the at least one PPL node of the PPL comprises transmitting an attachment request to each PPL node of the PPL.

3. The method of claim 1, wherein said each PPL node in the PPC is further associated with a last update time.

4. The method of claim 1, further comprising the step of:

transmitting, by the second device, a probe request to at least one FPL node of the FPL.

5. The method of claim 4, further comprising the steps of:

receiving, by the second device, a response to the probe request from said at least one FPL node of the FPL; and transmitting, by the second device, an attachment request to said at least one FPL node of the FPL which transmitted the response to the probe request.

6. The method of claim 5, wherein the step of transmitting, by the second device, the attachment request is transmitted while the second device is attached to the at least one PPL node of the PPL.

7. The method of claim 6, wherein the step of transmitting, by the second device, the attachment request is based on a better parent condition.

8. The method of claim 7, wherein the better parent condition is based from at least one of the following:

a number of logical hops between a video source node of the multicast group and the at least one FPL node that transmitted the response to the probe request and a number of logical hops between the video source node and the at least one PPL node with which the second device is attached, wherein the number of logical hops between the video source node and the at least one FPL node is based on a count of nodes, including the video source node, between the video source node and the at least one FPL node, and wherein the number of logical hops between the video source node and the at least one PPL node is based on a count of nodes, including the video source node, between the video source node and the at least one PPL node;

a round trip time value between the second device and the at least one FPL node that transmitted the response to the probe request and a round trip time value between the second device and the at least one PPL node with which the second device is attached; and a video quality of a video received at the second device based on whether the video is received at the second device via the at least one FPL node that transmitted the response to the probe request or the video quality of the video received at the second device via the at least one PPL node with which the second device is attached.

9. The method of claim 6, wherein the step of transmitting a departure message to the at least one PPL node with which the second device is attached is based on a handover condition.

10. The method of claim 9, wherein the handover condition is based on at least one of the following:
 a count of duplicate packets received by the second device via the at least one FPL node of the FPL and via the at least one PPL node; and
 a packet sequence number received by the second device via the at least one FPL node of the FPL and via the at least one PPL node.

11. The method of claim 1, further comprising the step of:
 transmitting, by the second device, a heartbeat message to a child node, wherein the heartbeat message comprises an estimated available bandwidth of the second device, wherein the child node is a node of the one or more nodes of the multicast group, and wherein the second device has a parent and child relationship with the child node.

12. The method of claim 11, further comprising the steps of:
 receiving the transmitted heartbeat message, by a third device; and
 updating, by the third device, a data store associated with the third device, wherein the data store comprises estimated bandwidth information with each estimated bandwidth associated with one node from the one or more nodes of the multicast group, wherein the second device is one of the one or more nodes of the multicast group, and wherein the step of updating by the third device comprises updating the estimated bandwidth information associated with the second device based on the second device estimated available bandwidth from the heartbeat message.

13. The method of claim 1, further comprising the steps of:
 monitoring by the second device receipt of heartbeat messages adapted to be received from a child node, wherein the child node is one of the one or more nodes of the multicast group; and
 if monitored heartbeat messages are not received by the second device based on a defined condition, then transmitting a departure message to the first device indicating that the child node is in a state of departure and updating, by the first device, the PPC by updating the estimated available bandwidth associated with the child node and the second device.

14. The method of claim 1, further comprising the steps of:
 transmitting to the first device a departure message indicating that the second device is in a state of departure; and
 updating by the first device the PPC by updating the estimated available bandwidth associated with the second device, wherein the second device is a node of the one or more nodes of the multicast group.

15. A device adapted to be operably connected to a multicast group, the device comprising:
 a preferred peer cache management module adapted to:
  maintain a preferred peer cache (PPC) associated with the multicast group comprising one or more nodes, wherein the PPC comprises one or more PPL nodes, each of the PPL nodes is associated with a node from the one or more nodes of the multicast group and wherein each PPL node is associated with a node-identifying information, an estimated available bandwidth of said each PPL node, a use count, and one or more relationships between said each PPL node to another node of the one or more nodes in the multicast group; and
  update the PPC if at least one of the following occurs:
   a departure message is received indicating that a node of the one or more nodes of the multicast group is in a state of departure from the multicast group; and
   a join report message is received indicating that a new node has joined the multicast group to become a node of the one or more nodes of the multicast group; and
 flat peer list (FPL) and preferred peer list (PPL) generation module adapted to:
  generate a PPL based on the PPC, wherein the PPL comprises one or more PPL nodes;
  generate a flat peer list (FPL) comprising one or more FPL nodes, wherein the one or more FPL nodes are randomly selected nodes from the one or more nodes of the multicast group; and
  transmit the generated FPL and the generated PPL in response to a join request by a joining node.

16. The device of claim 15 wherein the preferred peer cache management module is further adapted to update the PPC by updating each of the estimated available bandwidth of said PPL node contained in the received join report message.

17. The device of claim 15 wherein the preferred peer cache management module is further adapted to update the PPC by updating each of the estimated available bandwidth of said PPL node contained in the received departure message.

18. A device adapted to be operably connected to a multicast group comprising one or more nodes and a rendezvous point server, the device comprising:
 a rendezvous point interface module adapted to:
  receive, from the rendezvous point server, a flat peer list (FPL) comprising one or more FPL nodes, wherein the one or more FPL nodes are randomly selected from the one or more nodes of the multicast group; and
  receive, from the rendezvous point server, a preferred peer list (PPL) comprising one or more PPL nodes, wherein each PPL node is associated with a node of the one or more nodes of the multicast group a use count, and wherein each PPL node is associated with an estimated bandwidth;
 a node attachment module adapted to:
  transmit an attachment request to a node of the one or more nodes of the multicast group;
  receive an attachment response in response to the transmitted attachment request; and
  transmit a join report message to the rendezvous point server based on the received attachment response; and a heartbeat module adapted to:
    transmit at least one heartbeat message;
    monitor heartbeat messages; and
    if heartbeat messages are not received based on a condition, transmit a departure message indicating that a node of the one or more nodes of the multicast group is in a state of departure.

19. The device of claim 18, wherein the heartbeat module is further adapted to monitor heartbeat messages originating from at least one of the following:
    one or more child nodes;
    one or more parent nodes.

20. The device of claim 18, further comprising:
    a FPL probe module adapted to:
        transmit a probe request to at least one FPL node of the FPL;
        receive a probe response from the at least one FPL node in response to the transmitted probe request; and
        transmit an attachment request to the at least one FPL node when the probe response is received from the at least one FPL node.

21. The device of claim 20 wherein the FPL probe module is further adapted to transmit the attachment request when a better parent condition is determined after being attached to a PPL node of the one or more nodes via a direct attachment.

* * * * *